United States Patent
Al Kassas

(10) Patent No.: US 10,280,679 B2
(45) Date of Patent: May 7, 2019

(54) SYSTEM FOR RETROFITTING GLAZING SYSTEMS OF BUILDINGS

(71) Applicant: INOVUES, INC., Houston, TX (US)

(72) Inventor: Anas Al Kassas, Houston, TX (US)

(73) Assignee: INOVUES, INC., Houston, TX (US)

(*) Notice: Subject to any disclaimer, the term of this patent is extended or adjusted under 35 U.S.C. 154(b) by 0 days.

(21) Appl. No.: 16/192,938

(22) Filed: Nov. 16, 2018

(65) Prior Publication Data

US 2019/0085618 A1   Mar. 21, 2019

Related U.S. Application Data

(63) Continuation-in-part of application No. PCT/US2018/027306, filed on Apr. 12, 2018.

(60) Provisional application No. 62/484,842, filed on Apr. 12, 2017.

(51) Int. Cl.
*E04B 2/88* (2006.01)
*E06B 3/54* (2006.01)

(52) U.S. Cl.
CPC .......... *E06B 3/5418* (2013.01); *E06B 3/5427* (2013.01); *E04B 2/88* (2013.01)

(58) Field of Classification Search
CPC ........ E06B 3/5418; E06B 3/5427; E04B 2/88; E04B 2/96; E04B 2/885; E04B 2/90
See application file for complete search history.

(56) References Cited

U.S. PATENT DOCUMENTS

| | | | |
|---|---|---|---|
| 1,679,802 A | 8/1928 | Allerheiligen et al. | |
| 1,694,677 A | 12/1928 | Will | |
| 1,753,618 A | 4/1930 | Norbeck | |
| 3,553,913 A | 1/1971 | Eisenberg | |
| 4,089,143 A | 5/1978 | La Pietra | |
| 4,320,609 A | 3/1982 | Abell | |
| 4,357,187 A | 11/1982 | Stanley et al. | |
| 4,452,020 A | 6/1984 | Werner | |
| 4,483,122 A * | 11/1984 | Crandell | E04F 13/0889 52/235 |
| 4,499,703 A | 2/1985 | Rundo | |

(Continued)

FOREIGN PATENT DOCUMENTS

| | | |
|---|---|---|
| DE | 3825580 A1 | 2/1990 |
| DE | 19513623 A1 | 10/1996 |

(Continued)

OTHER PUBLICATIONS

Written Opinion, by the ISA/RU, dated Aug. 23, 2018, regarding PCT Application No. PCT/US2018/027306.

(Continued)

*Primary Examiner* — Brian D Mattei
(74) *Attorney, Agent, or Firm* — Bill R. Naifeh

(57) ABSTRACT

A glazing shield system for retrofitting glazing systems of buildings is disclosed. The glazing shield system includes a support frame and a unitized panel. In certain embodiments, the glazing shield system may be mounted on an existing glazing system in a non-intrusive and non-destructive method. In one embodiment, the support frame may be attached to an infill panel of an existing glazing system using structural adhesives, and the unitized panel may be mounted on the support frame, creating an insulating glazing shield.

7 Claims, 17 Drawing Sheets

(56) References Cited

U.S. PATENT DOCUMENTS

| | | | |
|---|---|---|---|
| 4,543,755 A * | 10/1985 | Crandell | E06B 3/5427 52/204.62 |
| 4,614,069 A * | 9/1986 | Tanikawa | E04B 1/98 52/204.591 |
| 4,658,559 A | 4/1987 | Doherty | |
| 4,738,065 A * | 4/1988 | Crandell | E06B 3/5427 52/235 |
| 4,744,403 A | 5/1988 | Hausmann et al. | |
| 4,768,321 A * | 9/1988 | Crandell | E04F 13/0808 52/235 |
| 4,813,203 A | 3/1989 | Newman et al. | |
| 4,825,609 A | 5/1989 | Rundo | |
| 4,873,803 A | 10/1989 | Rundo | |
| 4,961,975 A * | 10/1990 | Bejnar | E06B 3/5427 156/109 |
| 5,713,167 A | 2/1998 | Durham et al. | |
| 5,737,885 A | 4/1998 | Stoyke | |
| 5,950,398 A | 9/1999 | Hubbard | |
| 6,269,600 B1 * | 8/2001 | Tambakakis | E04B 2/885 52/235 |
| 6,286,288 B1 | 9/2001 | France | |
| 6,429,961 B1 | 8/2002 | Harary et al. | |
| 6,509,071 B1 | 1/2003 | Emek | |
| 6,536,182 B2 | 3/2003 | France | |
| 6,612,091 B1 | 9/2003 | Glover et al. | |
| 6,823,643 B2 | 11/2004 | France | |
| 7,040,062 B2 | 5/2006 | Emek | |
| 7,100,343 B2 | 9/2006 | France | |
| 7,174,692 B1 | 2/2007 | Vickers et al. | |
| 7,763,334 B2 | 7/2010 | Berkowitz | |
| 8,567,142 B2 * | 10/2013 | Swartz | E06B 3/5427 52/209 |
| 9,234,381 B2 | 1/2016 | Wexler et al. | |
| 9,752,319 B1 * | 9/2017 | LeVan | E04B 2/965 |
| 9,790,735 B2 | 10/2017 | Trott | |
| 2003/0226321 A1 | 12/2003 | Engebretson | |
| 2004/0040232 A1 | 3/2004 | Memari et al. | |
| 2005/0055911 A1 | 3/2005 | France | |
| 2006/0254203 A1 | 11/2006 | France | |
| 2010/0269426 A1 | 10/2010 | Richter et al. | |
| 2011/0167741 A1 | 7/2011 | Surace | |
| 2013/0014636 A1 * | 1/2013 | Dehghanyar | E04H 9/06 89/36.02 |
| 2014/0113541 A1 * | 4/2014 | Drier, II | F24F 7/00 454/222 |
| 2014/0345215 A1 * | 11/2014 | Magoon | E06B 3/5427 52/235 |
| 2016/0145934 A1 | 5/2016 | Trott | |
| 2016/0298938 A1 | 10/2016 | Trott | |

FOREIGN PATENT DOCUMENTS

| | | |
|---|---|---|
| DE | 202005010702 U1 | 9/2005 |
| EP | 1640523 A2 | 3/2006 |
| GB | 2341200 A | 3/2000 |
| KR | 20150065545 A | 6/2015 |
| RU | 2599243 C1 | 10/2016 |
| WO | 2018191499 A1 | 10/2018 |

OTHER PUBLICATIONS

International Search Report, by the ISA/RU, dated Aug. 23, 2018, regarding PCT Application No. PCT/US2018/027306.

* cited by examiner

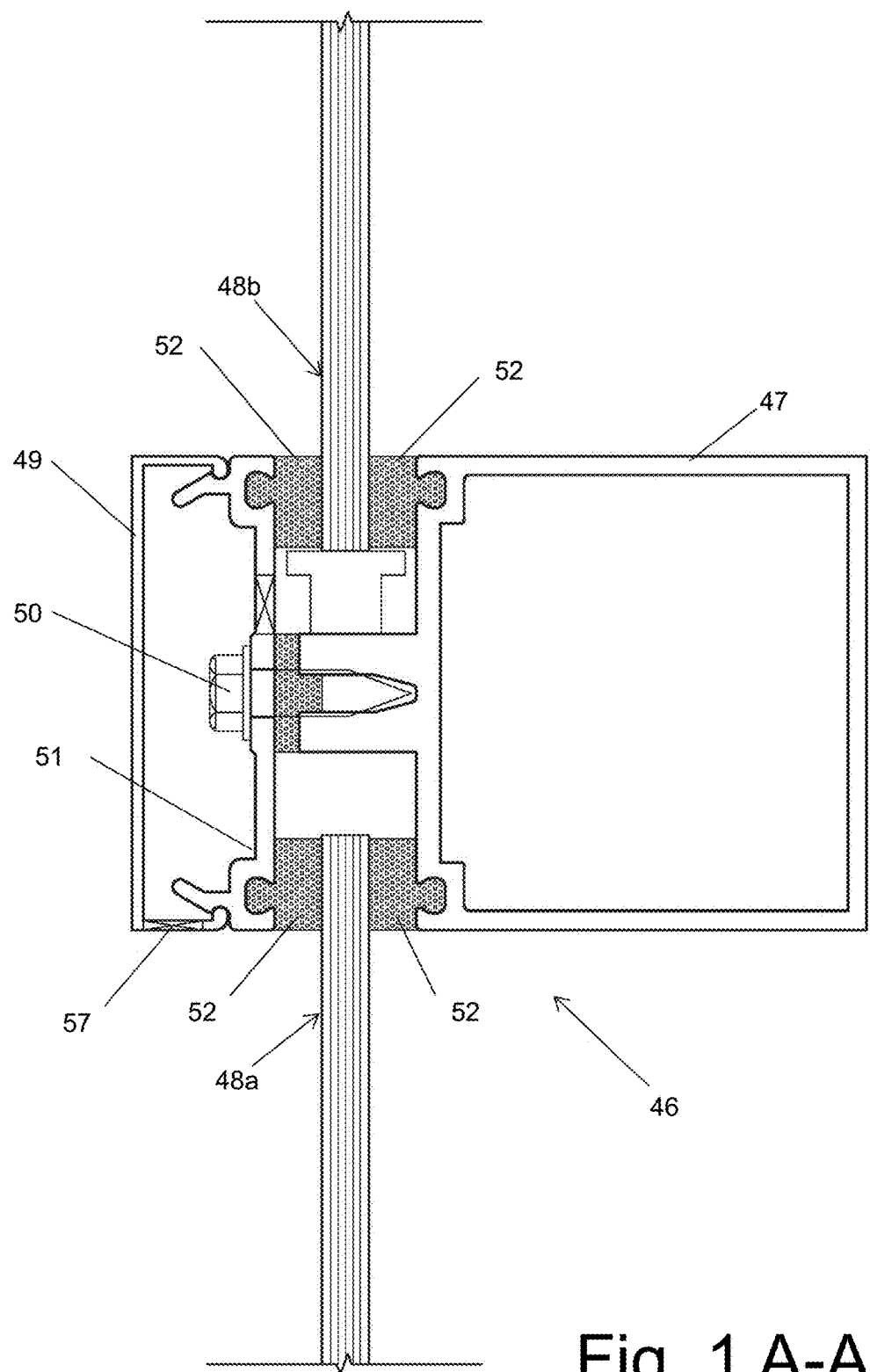
Fig. 1 A-A

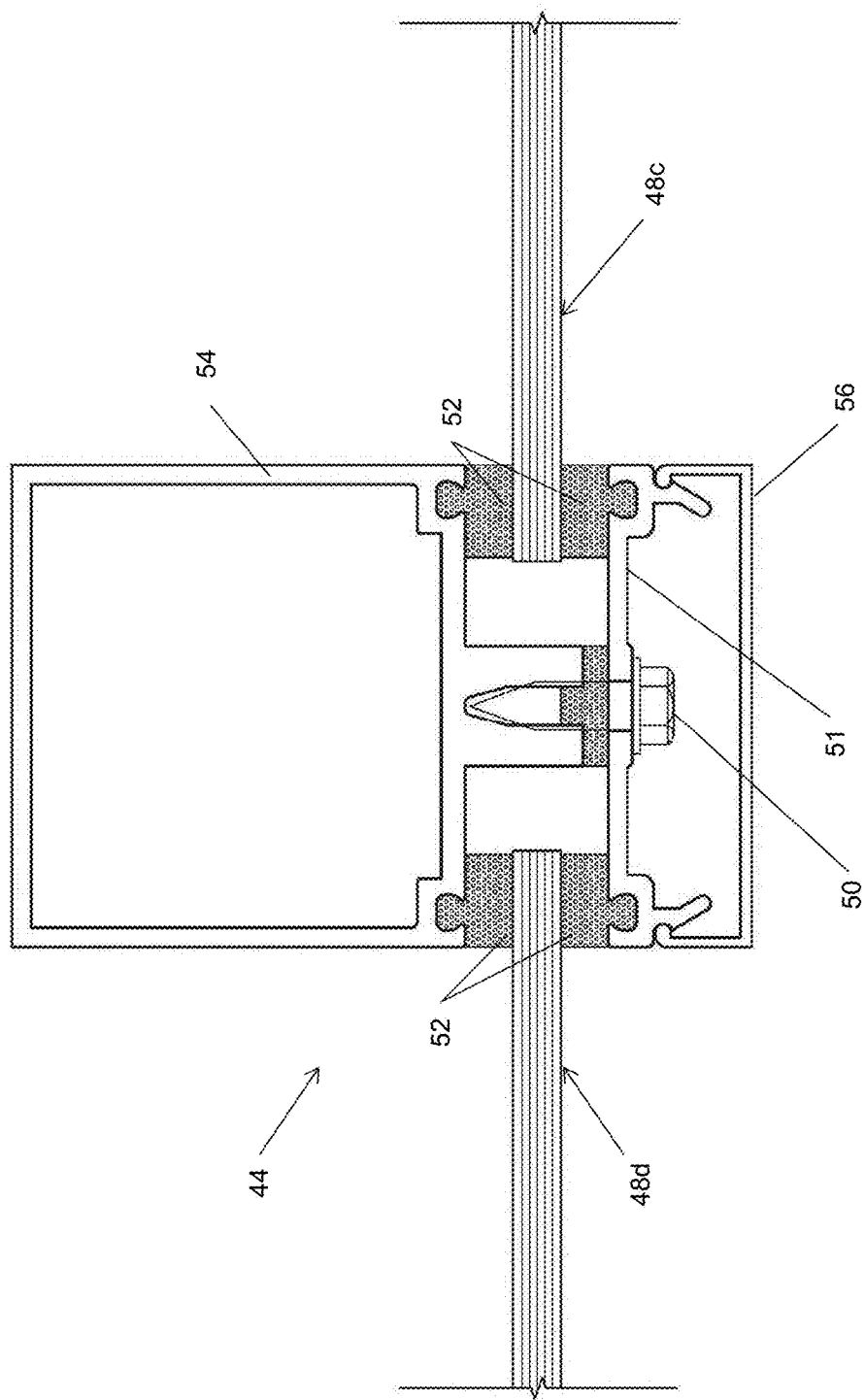
Fig. 1 B-B

US 10,280,679 B2

SYSTEM FOR RETROFITTING GLAZING SYSTEMS OF BUILDINGS

CROSS REFERENCE TO RELATED APPLICATIONS

This application is a continuation-in-part of and claims the benefit of the filing date of the International Application No. PCT/US2018/027306, filed on Apr. 12, 2018, entitled "System and Method for Retrofitting Glazing Systems of Buildings," which claims the benefit of U.S. Provisional Application Ser. No. 62/484,842, filed Apr. 12, 2017, entitled "System and Method for Retrofitting Glazing Systems of Buildings," of which all of the disclosures are hereby incorporated by reference for all purposes.

TECHNICAL FIELD

The invention relates in general to glazing systems like windows and curtain-walls and in particular to a system and method for retrofitting glazing systems of buildings.

BACKGROUND INFORMATION

Buildings are the number one end users of energy. They are responsible for about 40% of all energy consumption and carbon emissions in both developed and developing countries. One of the main reasons behind such huge consumption is that the majority of the existing building stock today is over 20 years old, and thus, most existing buildings have under-performing and inefficient building systems compared to the current technologies. That is why many cities that have recently committed to reducing their greenhouse gas emissions have started to target the energy efficiency of the existing building stock with measures that address all building systems, particularly those associated with and influenced by the building envelope.

The significance of the building envelope comes from the fact that its thermal performance and weather tightness determine the amount of energy needed to maintain a comfortable indoor environment relative to the outdoors. In fact, building envelope components can significantly impact heating, cooling, and ventilation loads in addition to lighting, which are the main areas of energy consumption in building operations. For example, it is estimated that about one third of the energy consumed in commercial buildings for heating and cooling is associated with windows.

Taking that into consideration, several research reports have highlighted that 20-40% of the total energy savings in buildings is projected to be from windows and building envelopes. This is because up until the 1980s, windows, curtain walls, and skylights were mainly single-glazed with frameworks that had no thermal breaks. These inefficient glazing systems result in significant heat loss in the winter and heat gain in the summer, and thus, lead to higher energy consumption for heating and cooling to maintain a comfortable indoor environment.

Today, it is estimated that about 40% of all commercial and multi-family residential buildings in the United States, for example, still have single-pane windows, and about half of the remaining 60% have early or low-performing double-pane window systems that lack significantly in performance compared to the current technologies and building and energy code requirements. The problem is that replacing these inefficient glazing systems with new, high-performing ones is often not a feasible option for most buildings due to the associated complexity, high upfront costs, building and business disruption, and long payback periods.

Additionally, most glazing systems, including the current ones, are still being designed with little consideration (if any) given to the high possibility of them requiring a retrofit in the future, leaving building owners with limited options when the need arises. That is why most façade and window retrofit practices available today include intrusive and complex measures that are associated with high upfront costs, building and business disruption, and long payback periods as well, and thus, they are often not considered a feasible option for most buildings.

Therefore, there is a growing technical and environmental need for feasible glazing and window retrofit solutions that can be widely adopted by most existing buildings to improve their energy efficiency.

SUMMARY

A glazing shield system and a method for retrofitting glazing systems of buildings are disclosed. The glazing shield system comprises a support frame and a unitized panel. In certain embodiments, the glazing shield system may be mounted on an existing glazing system in a non-intrusive and non-destructive method. In one embodiment, the support frame may be attached to an infill panel of an existing glazing system using structural adhesives, and the unitized panel may be mounted on the support frame, trapping a volume of air between the infill panel of the existing glazing system and the unitized panel of the present disclosure, creating an insulating glazing shield.

These and other features, and advantages, will be more clearly understood from the following detailed description taken in conjunction with the accompanying drawings. It is important to note the drawings are not intended to represent the only aspect of the invention.

BRIEF DESCRIPTION OF THE DRAWINGS

FIG. 1A-A is a vertical section view through a transom or portion of the existing glazing system of FIG. 1.

FIG. 1B-B is a horizontal section view through a mullion or portion of the existing glazing system of FIG. 1.

DETAILED DESCRIPTION

Figure 1:
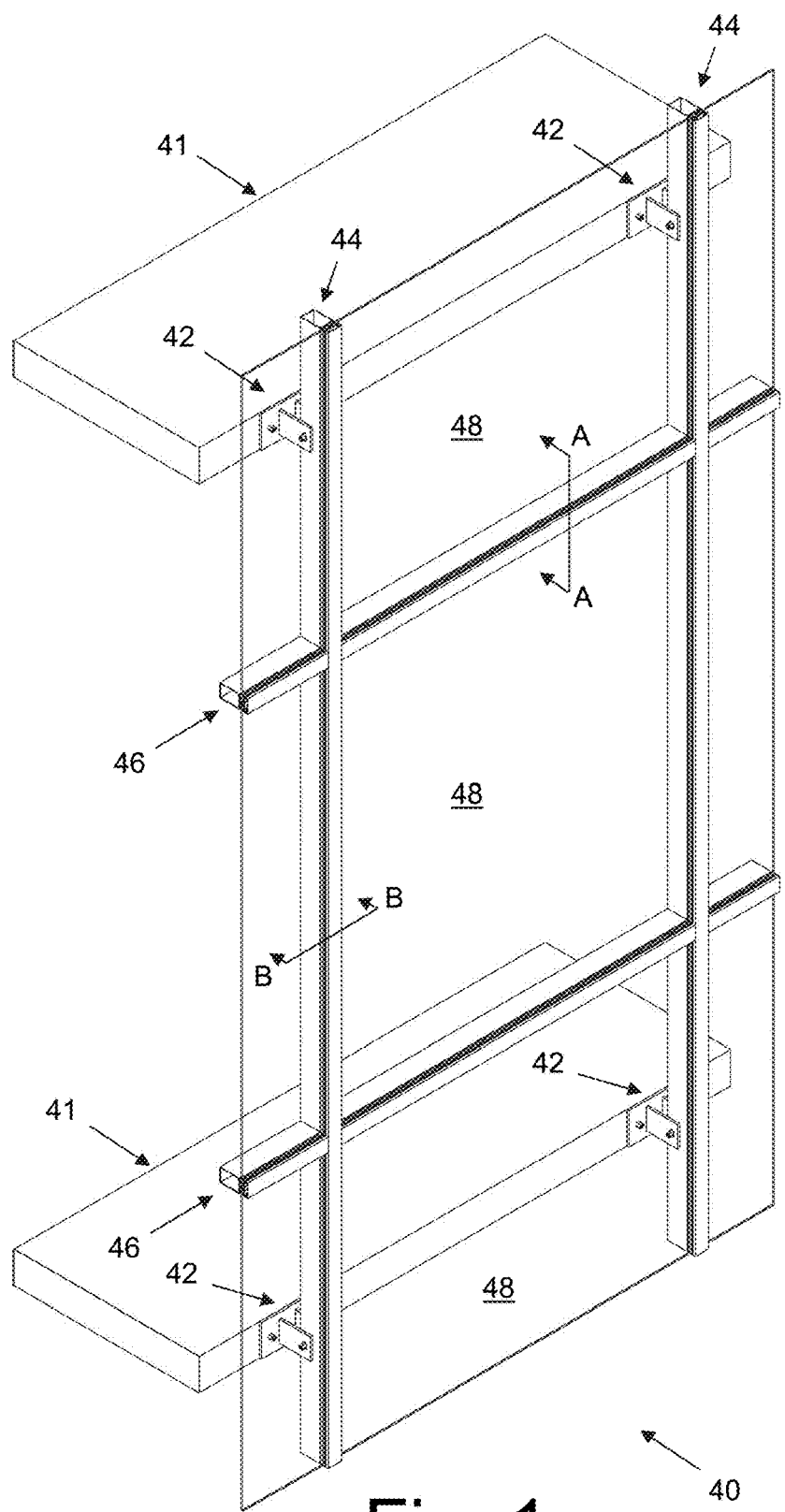
FIG. 1 illustrates a portion of an existing glazing system.

For the purposes of promoting an understanding of the principles of the present inventions, reference will now be made to the embodiments, or examples, illustrated in the drawings and specific language will be used to describe the same. It will nevertheless be understood that no limitation of the scope of the invention is thereby intended. Any alterations and further modifications in the described embodiments, and any further applications of the principles of the inventions as described herein are contemplated as would normally occur to one skilled in the art to which the invention relates.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

When directions, such as upper, lower, top, bottom, clockwise, counter-clockwise, are discussed in this disclosure, such directions are meant to only supply reference directions for the illustrated figures and for orientation of components in the figures. The directions should not be read to imply actual directions used in any resulting invention or actual use. Under no circumstances, should such directions be read to limit or impart any meaning into the claims.

Well-known elements are presented without detailed description in order not to obscure the present invention in unnecessary detail. For the most part, details unnecessary to obtain a complete understanding of the present invention have been omitted inasmuch as such details are within the skills of persons of ordinary skill in the relevant art. Details regarding control circuitry or control devices are within the skills of persons of ordinary skill in the relevant art. Consequently, such devices, circuits, and controllers, have been simplified to illustrate elements that are relevant for a clear understanding, while eliminating, for the purpose of clarity, many other elements found in such electronics. Those of ordinary skill in the art may recognize that other elements and/or steps are desirable and/or required in implementing certain controllers and electric circuits. However, because such elements and steps are well known in the art, and because they do not facilitate a better understanding of the present invention, a discussion of such elements and steps is not provided herein.

Existing Glazing Systems

FIG. 1 is an isometric drawing illustrating a portion of an exemplary existing glazing system 40. In the illustrated embodiment, the existing glazing system 40 may be a mechanically-glazed, stick-built curtain-wall system, which typically comprises anchor assemblies 42, vertical meeting rail assemblies 44, horizontal meeting rail assemblies 46, and infill panels 48. The anchor assemblies 42 are typically attached to the building structure 41, such as concrete floor slabs, and are used to transfer the load of the stick-built curtain-wall to the building structure. For purposes of illustration, the existing infill panels 48 may be monolithic glass panels.

FIG. 1A-A illustrates a vertical section view of a typical existing horizontal meeting rail assembly 46 joining an upper portion of an existing infill panel 48a and a lower portion of an existing infill panel 48b. Because details of existing meeting rail assemblies vary widely, such details will not be discussed in depth here. Generally, however, for the horizontal meeting rail assembly 46, there is a transom 47 and a transom cover 49 which couples to the transom 47 via an attachment system, such as a plurality of bolts 50 and a base plate 51. In certain embodiments, there may be some form of seals or gaskets 52 positioned adjacent to the perimeter of the infill panels 48a and 48b where they couple to the horizontal meeting rail assembly 46.

In contrast, FIG. 1B-B illustrates a horizontal section view of a typical vertical meeting rail assembly 44 joining a left side portion of an existing infill panel 48c and a right side portion of an existing infill panel 48d. Generally, the vertical meeting rail assembly 44 may include a mullion 54 and a mullion cover 56 which couples to the mullion 54 via an attachment system, such as a plurality of bolts 50 and a base plate 51. In certain embodiments, there may be some form of seal or gaskets 52 positioned adjacent to the perimeter of the infill panels 48c and 48d where they couple to the vertical meeting rail assembly 44.

The infill panels 48 may be any type of vision, spandrel, or shadow box glazing infill panel or any type of metal cladding infill panel. The panels 48 may be any type of monolithic, laminate, double-, triple-, or multi-pane panel of any configuration, or any other type of glazing infill panel.

The existing glazing system 40, shown in FIGS. 1, 1A-A, and 1B-B is exemplary only and is not intended to limit the scope of the invention in any way. The present invention may readily be used with a wide variety of new and existing glazing systems including, but not limited to, single-, double-, or multi-pane glazing systems, mechanically- or structurally-glazed systems, point-fixed glazing systems, stick-built and unitized curtain-walls, window-walls, fixed and operable windows, doors, skylights, sloped glazing, and the like.

Figure 2A:
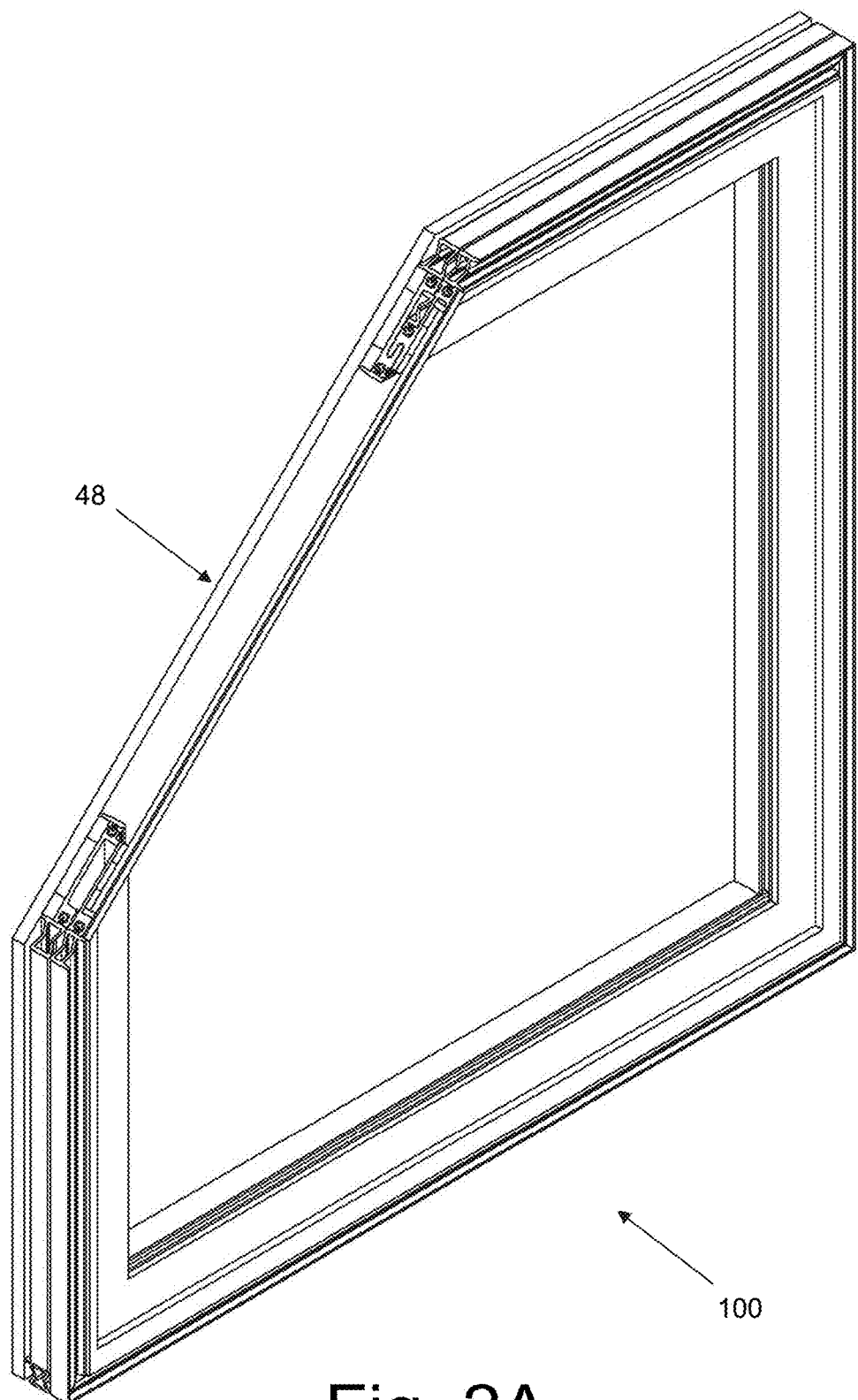
FIG. 2A is a partial isometric view of one embodiment of a system for retrofitting an existing glazing system.
Figure 2B:
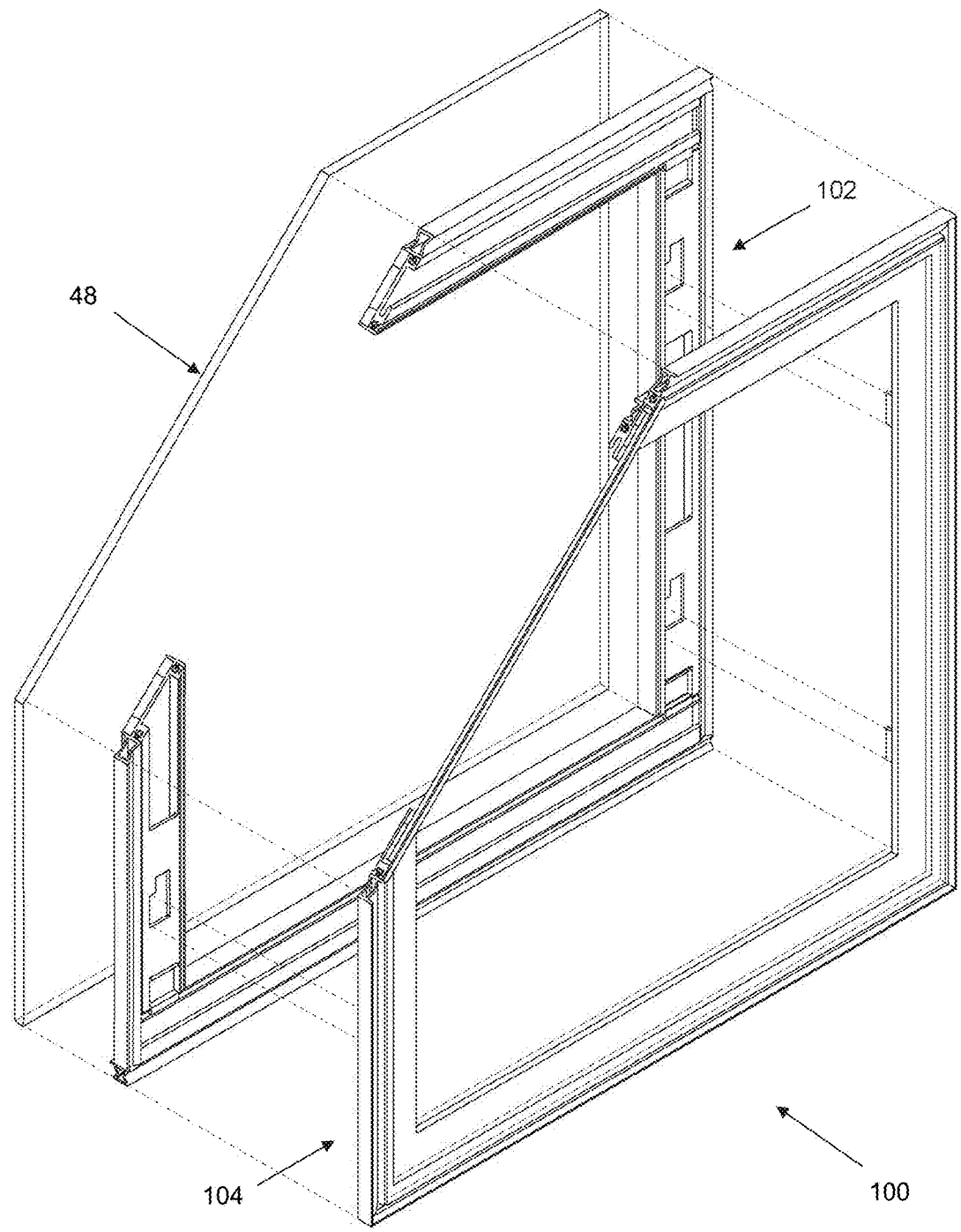
FIG. 2B is an exploded isometric view of the embodiment illustrated in FIG. 2A.

Overview of the Glazing Shield System:

FIG. 2A is an isometric drawing illustrating one embodiment of a glazing shield system 100 mounted on an infill panel, such as the existing infill panel 48 of the glazing system 40 illustrated in FIG. 1, discussed above. FIG. 2B is an exploded drawing of the glazing shield system 100, which typically comprises a support frame 102 and a unitized panel 104. In certain embodiments, the glazing shield system 100 may be mounted to the existing infill panel 48 in a non-intrusive and non-destructive method. In certain embodiments, the support frame 102 may be attached to the infill panel 48 using a peripheral attachment means or mechanism, such as structural adhesives, which as will be explained later, are applied to one face of a peripheral area of the infill panel 48.

In contrast, the unitized panel 104 may be mounted on the support frame 102 by mating with one or more mechanical mechanisms as discussed below. In certain embodiments, when the unitized panel 104 is mounted to the support frame 102 (which in turn, is mounted to the existing infill panel 48), a volume of air is then trapped between the infill panel 48 of the existing glazing system 40 and the unitized panel 104 of the present disclosure, creating an insulating glazing shield.

Figure 3A:
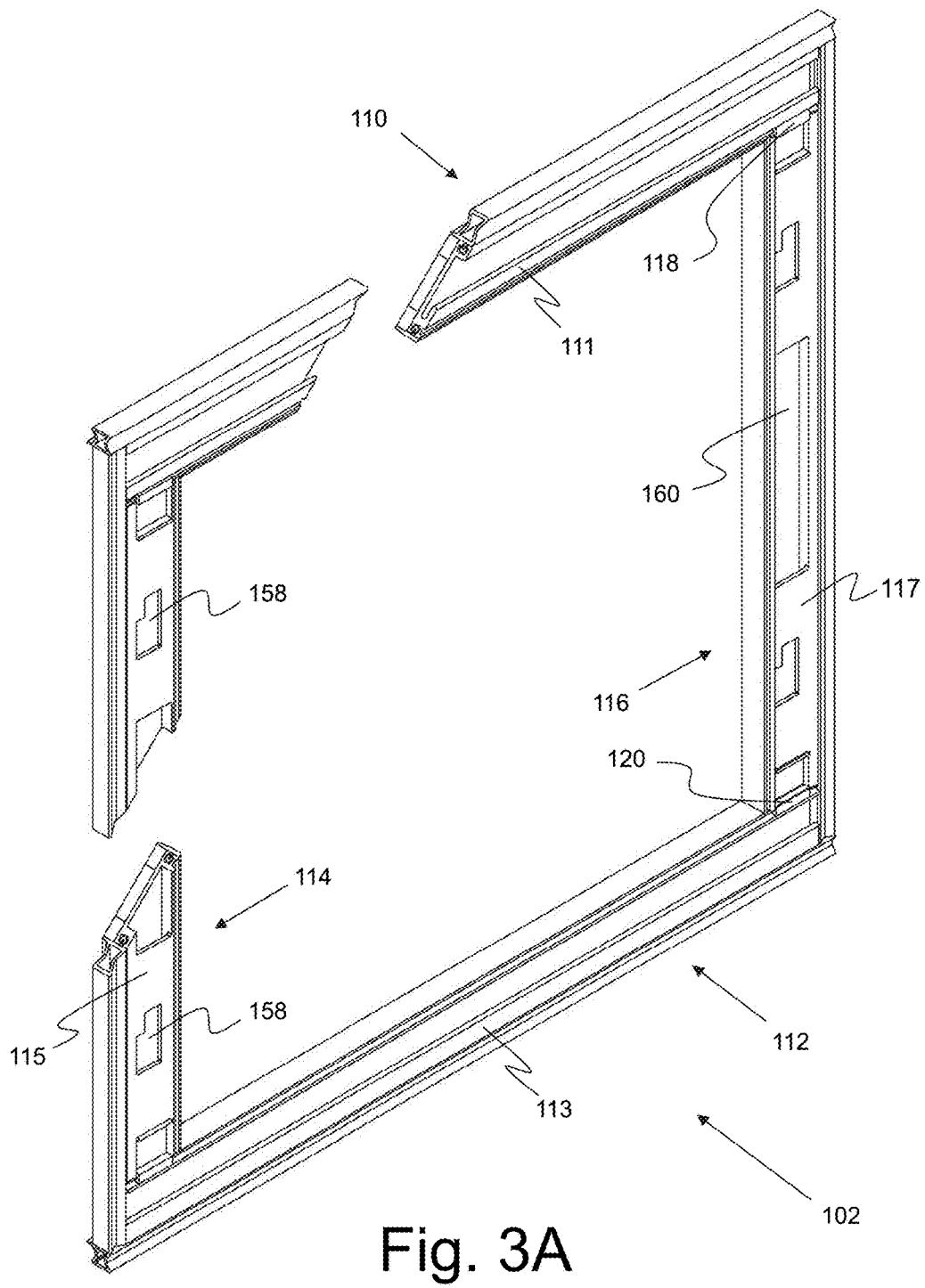
FIG. 3A is an isometric view of a support frame of the system illustrated in FIG. 2A.

The Support Frame:

Turning to FIG. 3A, there is an isometric drawing of the support frame 102 of the glazing shield system 100. In one embodiment, the support frame 102 comprises a top rail assembly 110, bottom rail assembly 112, and first side rail assembly 114 and a second side rail assembly 116. The top, bottom, and side rail assemblies 110, 112, 114, 116 further comprise a top rail member 111, a bottom rail member 113, a first side rail member 115, and a second side rail member 117, respectively. In one embodiment, the top, bottom, and side rail members 111, 113, 115, 117 may be made up of an extruded metal, such as aluminum. In an alternate embodiment, the top, bottom, and side rail members 111, 113, 115, 117 may be made up of an extruded composite or polymer-based material, such as vinyl, polyvinyl chloride (PVC), or unplasticized polyvinyl chloride (uPVC), for better thermal performance. An additional metal piece or extrusion may be used with the composite or polymer-based profiles for better adhesive bonding and structural performance.

In some embodiments, rail members, such as side rail members 115 and 117 may have a plurality of openings. Certain openings, such as openings 158 are designed to engage a series of protrusions (not shown) which may assist in coupling the unitized panel 104 to the support frame 102—as will be explained below. In other embodiments, other openings, such as openings 160 are designed to reduce the overall weight of the support frame 102. In yet other embodiments, various components, such as control components or desiccant elements, may reside in compartments and/or spaces created by such openings 160.

Figure 3B:
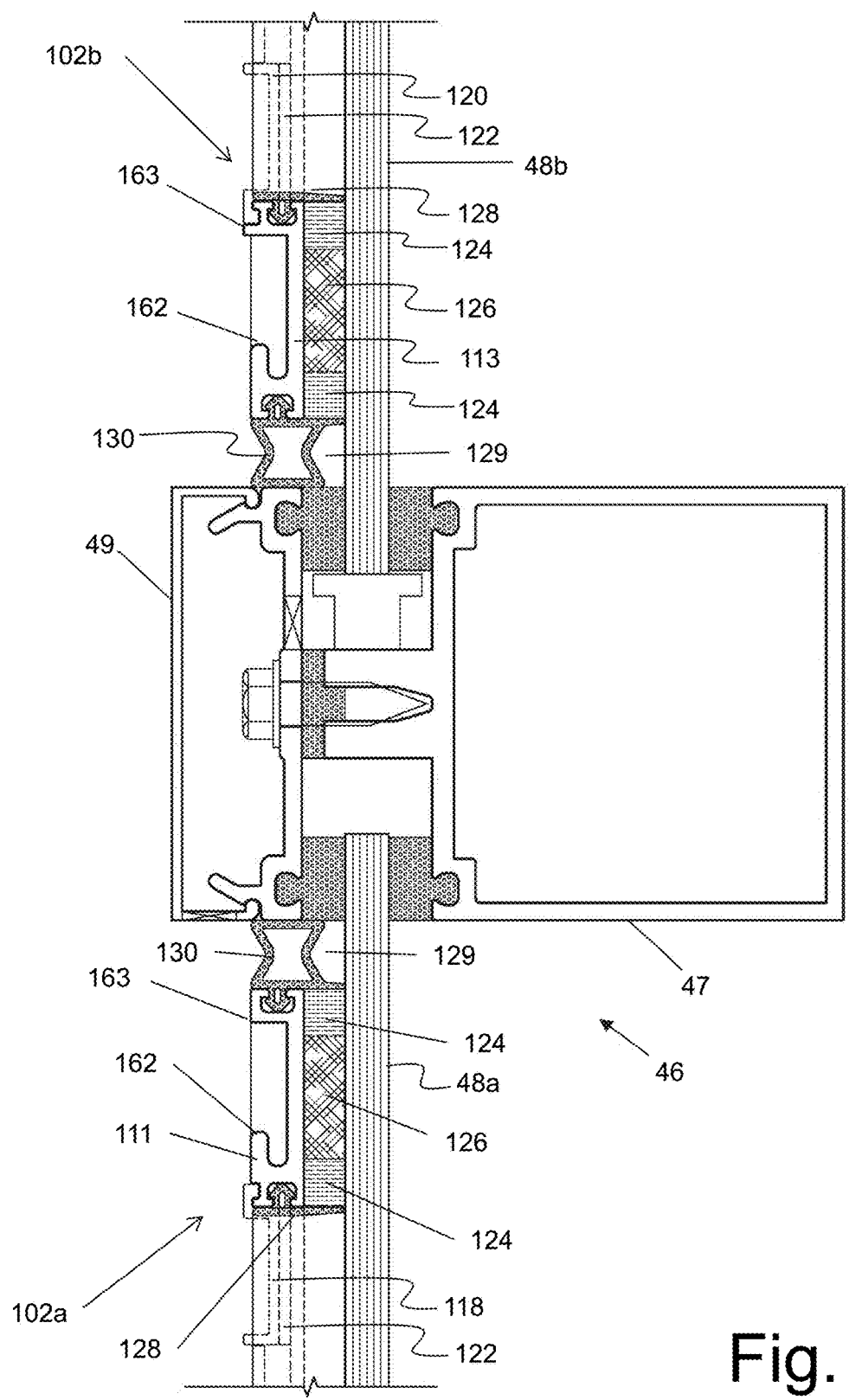
FIG. 3B is the vertical section view of the transom of FIG. 1A-A coupled to a lower portion of a first support frame and an upper portion of a second support frame.

FIG. 3B is a vertical section view of the existing horizontal meeting rail assembly 46 of the glazing system 40 as illustrated in FIG. 1A-A with the addition of two support frames positioned above and below the transom cover 49. As illustrated in FIG. 3B, there is an upper portion of support frame 102a, which includes the top rail member 111 and a lower portion of a support frame 102b which includes the bottom rail member 113. The top rail member 111 is shaped to include an interconnecting or anchoring means, which in certain embodiments, may include a hook-like protrusion 162. Similarly, the bottom rail member 113 is shaped to include an interconnecting or anchoring means which may also include a hook-like protrusion 162.

In addition to interconnecting features, the top rail member 111 and the bottom rail member 113 may be shaped in cross-section to engage with other components, such as rubber gaskets, connector pieces, or other components. In certain embodiments, there may be an additional protrusion 163 which may form cavities for seals and or desiccant elements when the system is assembled.

Figure 3C:
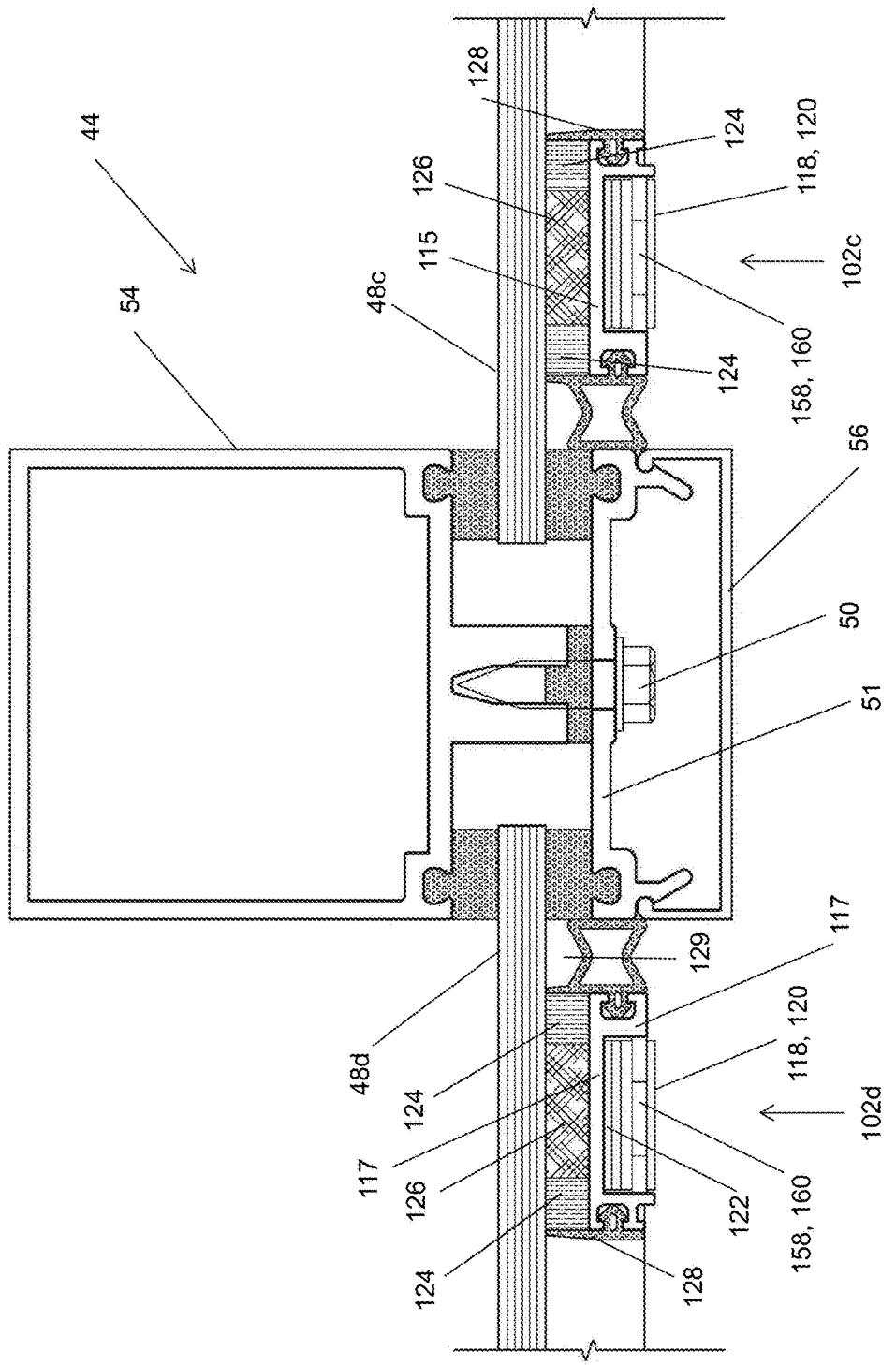
FIG. 3C is the horizontal section view of the mullion of FIG. 1B-B coupled to a side rail portion of a first support frame and a side rail portion of a second support frame.

FIG. 3C is a horizontal section view of the existing vertical meeting rail assembly 44 of the glazing system 40 as illustrated in FIG. 1B-B with the addition of two support frames positioned on either side of the mullion cover 56. As illustrated in FIG. 3B, there is a left side portion of support frame 102c, which includes the side rail member 115 and a right side portion of a support frame 102d which includes the side rail member 117. Generally, the side rail member 115 and 117 may be shaped to allow the formation of a cavity or compartment for seals and other components discussed below. Additionally, the side rail member 115 and the side rail member 117 may be shaped in cross-section to engage with other components, such as rubber gaskets, connector pieces, or other components, such as a rubber gasket 130.

In one embodiment, as shown in FIGS. 3B and 3C, the support frame 102 may be attached to the infill panel(s) 48 using a peripheral attachment means or mechanism. For instance, a structural adhesive may be applied to surfaces of the top rail member 111, the bottom rail member 113, the first side rail member 115, and the second side rail member 117 which will face the infill panel(s) 48. As will be explained below, the rail members forming the support frame 102 may then be pressed against the existing infill panel(s) 48 which, will in turn, cause the structural adhesive to engage a perimeter area of the infill panel 48. Thus, the support frame 102 will then be coupled to a peripheral area of the infill panel 48.

A wide variety of peripheral attachment means (e.g., structural adhesives) may be used to couple the support frame 102 to the infill panel 48. In one embodiment, a structural adhesive seal 126, such as Dow Corning® structural silicone sealants, which may be applied in the field to the top, bottom, and side rail members 111, 113, 115, and 117. Additionally, one or more double-sided peripheral adhesive tapes 124 may be applied to the top, bottom, and side rails 111, 113, 115, 117 in the shop or in the field to define an area for the structural adhesive seal 126 and to hold the rails in place as a means for temporary attachment until the structural adhesive seal 126 may be fully cured and ready to carry the load of the assembled system.

In one embodiment, one or more of the double-sided peripheral adhesive tapes 124 maybe polyisobutylene or butyl glazing tapes for a lower water vapor transmission rate ("WVTR"), and/or structural adhesive tapes for a higher initial load resistance. A rubber gasket 128 may be used to cover the exposed side of the adhesive tapes and the top, bottom, and side rails 111, 113, 115, 117.

Figure 4A:
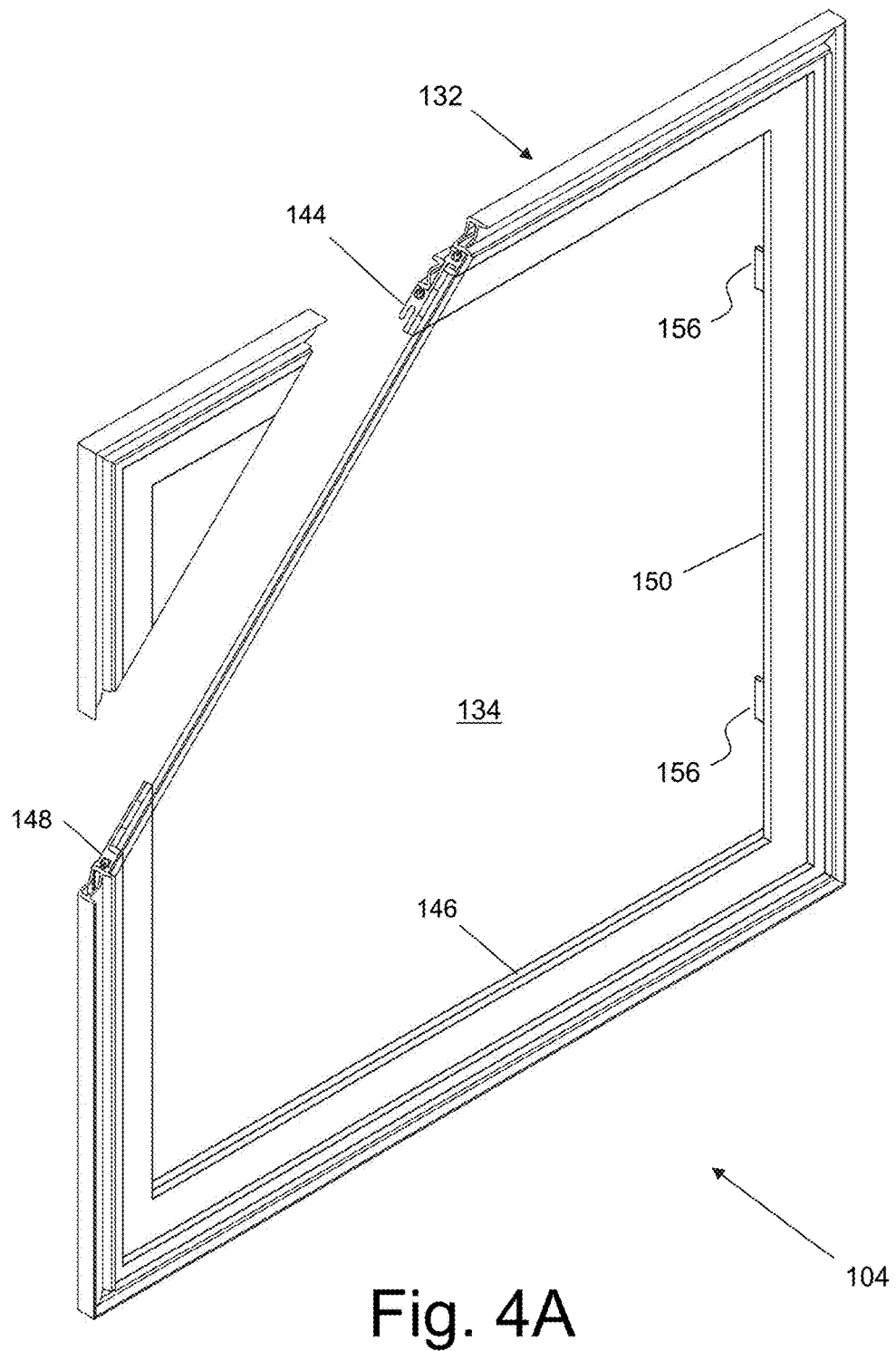
FIG. 4A is an isometric view of a unitized panel of the system illustrated in FIG. 2A.
Figure 4B:
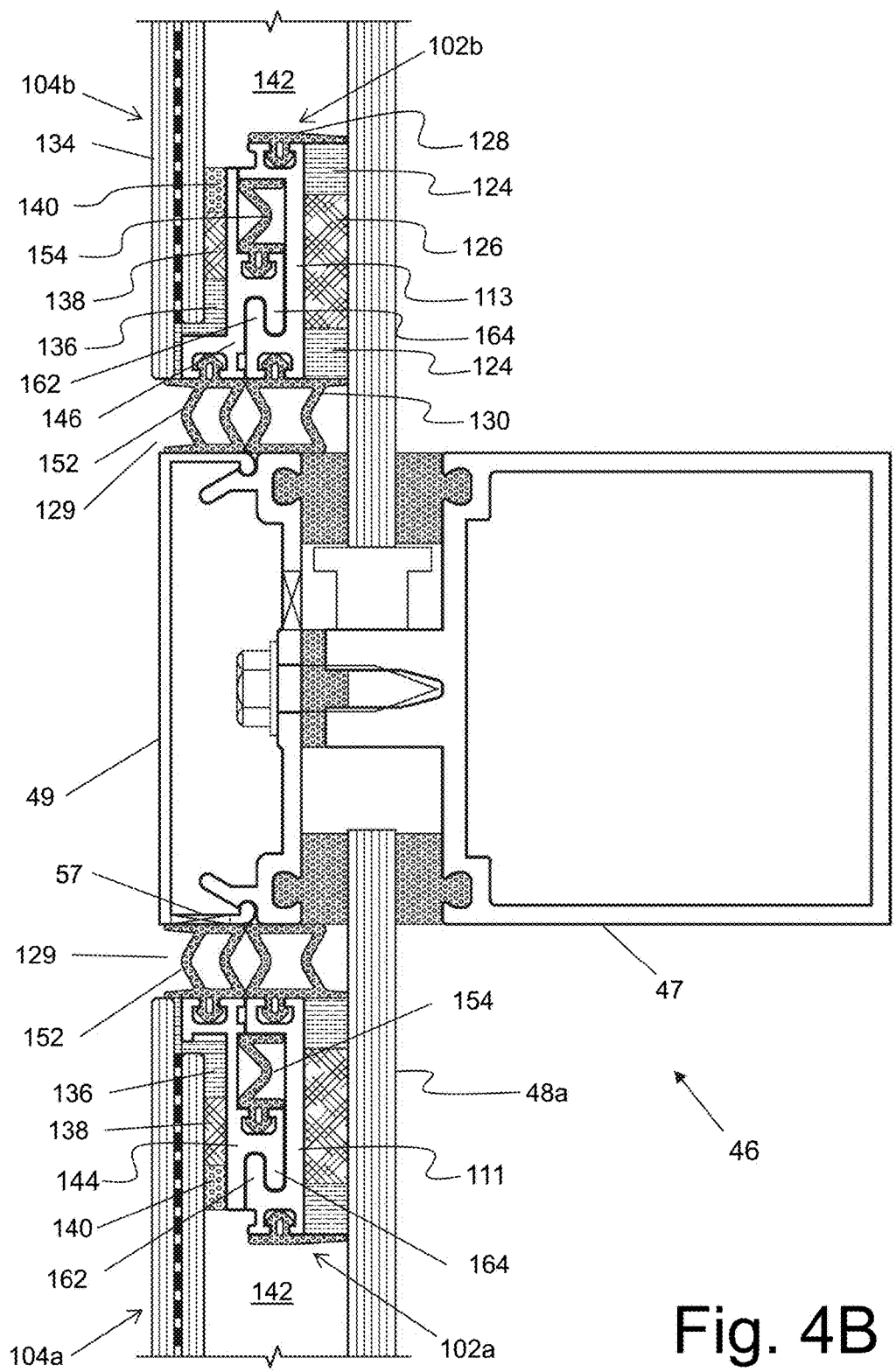
FIG. 4B is the vertical section view of the transom and support frames of FIG. 3A coupled to a lower portion of a first unitized panel and an upper portion of a second unitized panel.
Figure 4C:
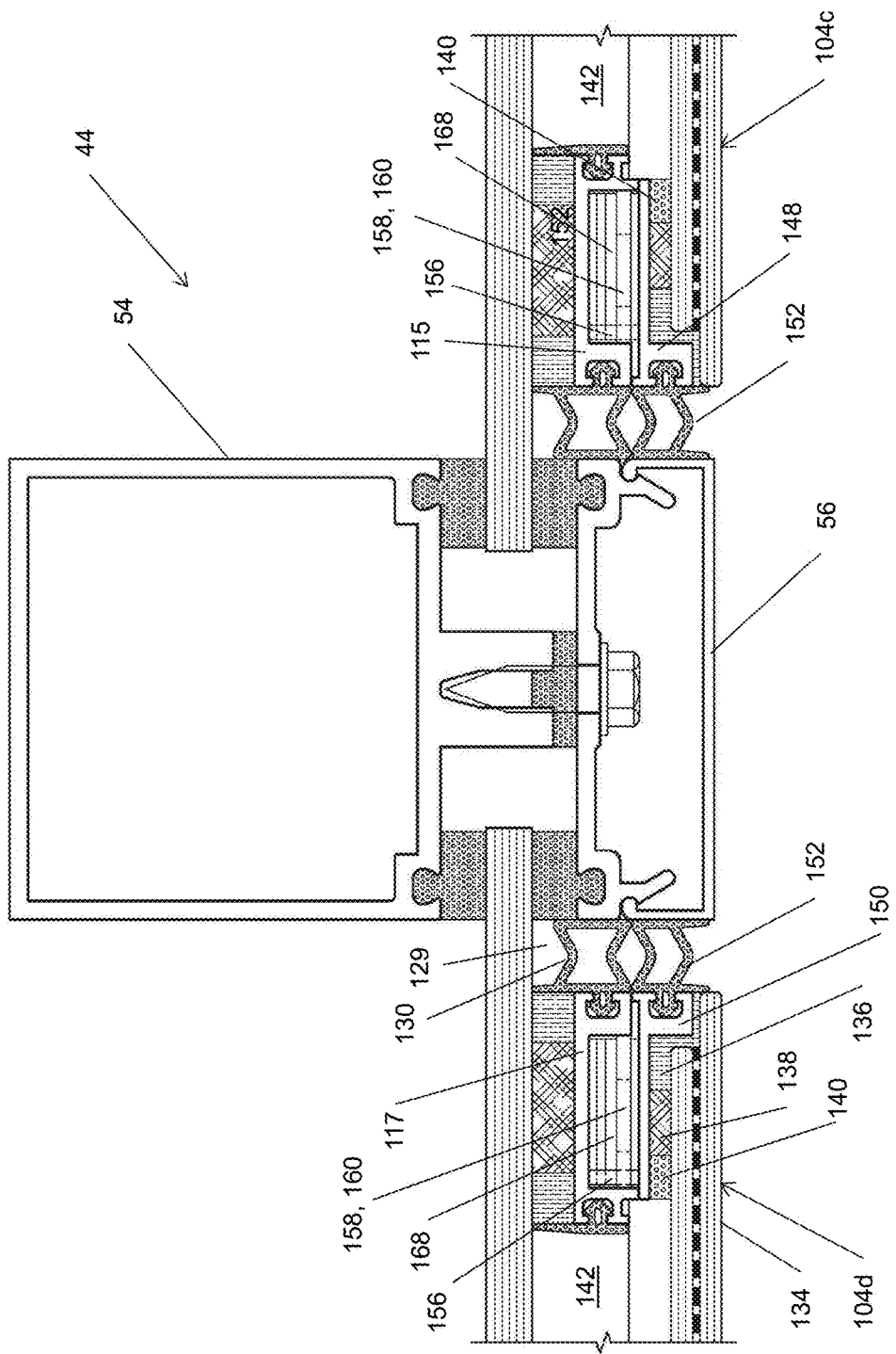
FIG. 4C is the section view of the mullion and support frames of FIG. 3B coupled to a side portion of a first unitized panel and a side portion of a second unitized panel.
Figure 4D:
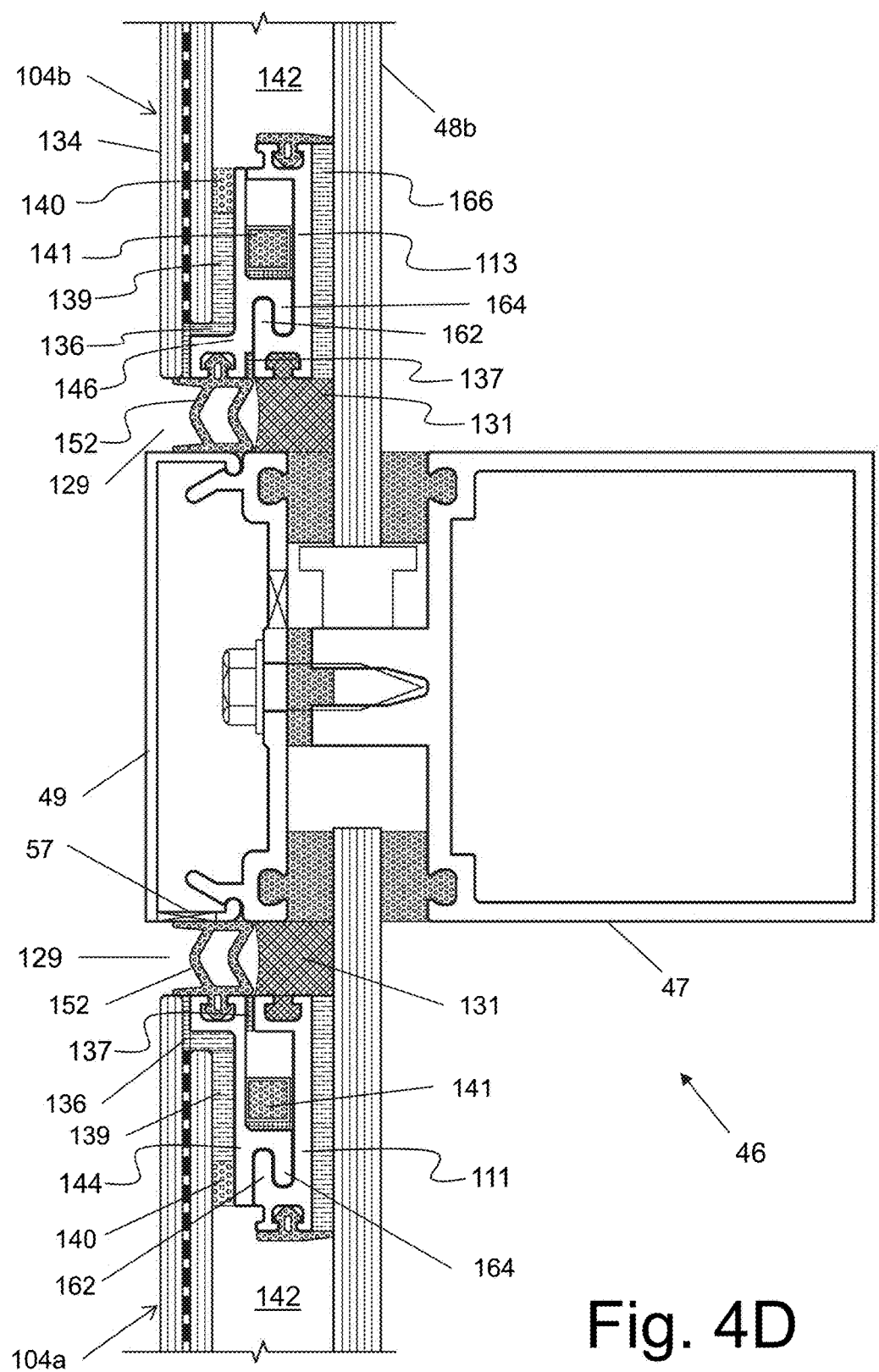
FIG. 4D is a vertical section view of an alternative embodiment illustrating a lower portion of a first support frame and an upper portion of a second support frame coupled to a lower portion of a first unitized panel and an upper portion of a second unitized panel, respectively.

In an alternate embodiment, as shown in FIG. 4D, a shop or field-applied double-sided structural adhesive tape 166, such as 3M® VHB tapes, may be substituted for the structural adhesive seal 126 along with one or all of its associated double-sided adhesive tapes 124 in the top, bottom, and side rail members 111, 113, 115, 117, or only in the side rail members 115, 117. It should be noted that the sizes of the structural adhesive elements are exemplary only and not intended to limit the scope of the present disclosure. Typically, their sizes are determined based on case-by-case structural calculations.

Turning back to FIGS. 3B and 3C, in certain embodiments, a gap 129 may be formed around the periphery of the glazing shield system 100. A portion of the gap 129 for the support frame 102a is illustrated as formed between the upper profile member 111 and the transom cover 49. A similar portion of the gap 129 for the support frame 102b is illustrated as formed between the lower profile member 113 and the transom cover 49. The gap 129 provides dimensional tolerance and allows for installation, panel movement, and thermal expansion. In one embodiment, the gap 129 may be set/defined using standard or custom spacing tools or removable installation caps coupled to the support frame 102. In one embodiment, a dry seal, such as a rubber gasket 130, may be used on the outside periphery of the support frame 102 to fill the gap 129 and create a rear air-and-water barrier around the periphery of the support frame 102. In an alternate embodiment, a continuous wet seal 131 that may be applied in the field after installing the support frame 102 may substitute the rubber gasket 130 (as shown in FIG. 4D) and may provide additional structural support. In certain embodiments, the wet seal 131 may be a sealant with a low WVTR such as a butyl- or polyurethane-based sealant. In some embodiments, one or more setting blocks or shims (not shown) may be used under the bottom rail assembly 112 for additional structural support.

The Unitized Panel:

FIG. 4A is a partially cut isometric view of an exemplary unitized panel which may be used with the current system 100. The unitized panel 104, which may be pre-assembled at a shop or a fabrication facility, comprises a unit frame 132 and an infill panel 134. In certain embodiments, the unit frame 132 comprises a top profile member 144, bottom profile member 146, and side profile members 148, 150, as shown in FIG. 4A. In one embodiment, the unit frame 132 (and its profile members) may be made up of an extruded metal, such as aluminum. In an alternate embodiment, the profile members may be made up of an extruded composite or polymer-based material, such as polyvinyl chloride (PVC) or unplasticized polyvinyl chloride (uPVC), for better thermal performance. In such embodiments, an additional metal piece or extrusion may be used with the composite or polymer-based profile members for better adhesive bonding and structural performance.

The infill panel 134 may be any type of vision, spandrel, shadowbox, or cladding infill panel. The infill panel 134 may be made up of single or composite materials including, but not limited to, glass, polymer-based materials such as acrylic or polycarbonate, or metal such as aluminum. In one embodiment, the infill panel 134 may be a monolithic glazing panel of a single or laminated glass of any type or configuration. In another embodiment, the infill panel 134 may be an insulating glass unit with double or multi-layers of any type or configuration, including vacuum insulated panels. The infill panel 134 can be a clear, semi-transparent, translucent, or opaque infill panel.

In certain embodiments, the infill panel 134 may incorporate one or a combination of films and/or coatings of any type including, but not limited to, solar control films, polymer dispersed liquid crystal (PDLC) films, hard (sputtered) or soft (pyrolytic) coatings like metal oxide coatings, low emissivity coatings, electrochromic coatings, thermochromic coatings, photovoltaic coatings and the like.

FIG. 4B is a vertical section view of the existing horizontal meeting rail assembly 46 of the glazing system 40 as illustrated in FIG. 3B with the addition of two unitized panels positioned above and below the transom cover 49. The two unitized panels 104a and 104b are positioned adjacent and are illustrated mated to the support frames 102a and 102b.

FIG. 4D is also a vertical section view of the existing horizontal meeting rail assembly 46 of the glazing system 40 as illustrated in FIG. 3B with the addition of two unitized panels positioned above and below the transom cover 49. The two unitized panels 104a and 104b are positioned adjacent and are illustrated mated to the support frames 102a and 102b. The embodiment illustrated in FIG. 4D is conceptually similar to the embodiment illustrated in FIG. 4B, but the embodiment of FIG. 4D illustrates alternative details which will be discussed below.

As illustrated in FIGS. 4B and 4D, there is an upper portion of the unitized panel 104a, which includes the top profile member 144. The top profile member 144 is shaped to mate with the interconnecting or anchoring means of the top rail member 111. Specifically, in one embodiment, the top profile member 144 includes an inverted hook-like protrusion 164 sized and shaped to engage and fit within the hook-like space created by the protrusion 162 of the top rail member 111. In addition to interconnecting features, the top profile member 144 may be shaped in cross-section to engage with other components, such as rubber gaskets (e.g., rubber gasket 152 and rubber gaskets 154 of the embodiment illustrated FIG. 4B), connector pieces, or other components.

Similarly, the bottom profile member 146 of the unitized panel 104b may be shaped to mate with the interconnecting or anchoring means of the bottom rail member 113. For example, the bottom profile member 146 includes an inverted hook-like protrusion 164 sized and shaped to engage and fit within the space created by the hook-like protrusion 162 of the bottom rail member 113. In addition to interconnecting features, the bottom profile member 144 may be shaped in cross-section to engage with other components, such as rubber gaskets (e.g., rubber gasket 152 and rubber gaskets 154 of the embodiment illustrated in FIG. 4B), connector pieces, or other components.

FIG. 4C is a horizontal section view of the existing vertical meeting rail assembly 44 of the glazing system 40 as illustrated in FIG. 3C with the addition of two unitized panel positioned on either side of the mullion cover 56. As illustrated in FIG. 4C, there is a left side portion of a unitized panel 104c which includes a first side profile member 148, and a right side portion of a unitized panel 104d which includes a second side profile member 150. The first side profile member 148 and the second side profile member 150 may be shaped in cross-section to engage with other components, such as rubber gaskets (e.g., rubber gasket 152), connector pieces, or other components. Note that when the first side profile member 148 is positioned adjacent to the side rail member 115, a cavity or compartment 168 may be formed. Similarly, when the second side profile member 150 is positioned adjacent to the side rail member 117, a cavity or compartment 168 may be formed on the opposing side of the mullion cover 56.

Turning to FIGS. 4A through 4D, in one embodiment, the infill panel 134 may be structurally glazed to the unit frame 132 (e.g., profile members 144, 146, 148, and 150) using a structural adhesive seal 138, as shown in FIGS. 4B and 4C, or a structural adhesive tape 139, as shown in FIG. 4D, along with one or more continuous glazing tapes 136 and/or one or more setting blocks (not shown). One or more of the continuous glazing tapes 136 may be polyisobutylene or butyl glazing tapes for a lower WVTR. In an alternate embodiment, the infill panel 134 may be mechanically-glazed to the unit frame 132 using common methods presently known in the art. In one embodiment, the infill panel 134 may be a laminated glazing panel with a step between the panes comprising the laminate so that the unitized panel 104 would extend to the outside edge of the unit frame 132 and have a frameless-look as illustrated in FIGS. 4B to 4D. In an alternate embodiment, the unitized panel 104 may have an exposed frame edge where the unit frame 132 may be exposed or covered with a wet or dry seal.

In one embodiment, a dry seal, such as a rubber gasket 152, may be used on the outside periphery of the unitized panel 104 to fill the gap 129 and create a front air-and-water barrier around the periphery of the unitized panel 104. The rubber gasket 152 may be typically notched around existing drain holes 57 (see FIGS. 4B and 4D). In certain embodiments, the rubber gasket 152 may be mitered at the corners and may be bonded into one piece. In an alternate embodiment, a continuous wet seal, such as a butyl- or polyurethane-based sealant, may substitute the rubber gasket 152 for a lower WVTR and may be applied around the periphery after mounting the unitized panel 104 (without blocking the existing drain holes 57).

In one embodiment, a continuous double-sided adhesive tape 137 (see FIG. 4D) with a low WVTR, such as polyisobutylene or butyl glazing tapes, may be shop or field-applied to the unit frame 132 to create a continuous water vapor barrier around the perimeter between the support frame 102 and the unitized panel 104 once the unitized panel 104 is mounted on the support frame 102. In an alternate embodiment, a continuous wet seal, such as a butyl- or polyurethane-based sealant, applied in the field before mounting the unitized panel 104 may substitute the continuous double-sided adhesive tape 137. Additionally, a wet seal (not shown), such as a butyl- or polyurethane-based sealant, may be applied in the shop at the areas where the top, bottom, and side profile members 144, 146, 148, and 150 of the unit frame 132 meet at the corners for a lower WVTR.

In certain embodiments, the unit frame 132 may incorporate a desiccant element 140 to help in reducing the possibility of condensation forming on the surfaces adjacent to the newly-formed air gap 142. In one embodiment, the desiccant element 140 may be a warm spacer of silicone foam base with desiccant pre-fill and pre-applied side adhesive for bonding, such as Quanex Super Spacers. In certain embodiments, such as the embodiment illustrated in FIG. 4D, an additional desiccant element 141, such as a metal, composite, or polymer-based spacer filled with a desiccant material like molecular sieve, may be added to the unit frame 132 in the shop or in the field using for example a double-sided adhesive tape such as butyl glazing tapes, to further help in removing any residual moisture in the newly-formed air gap 142 and increase the overall desiccant capacity in the glazing shield system 100.

The engagement of the hook-like protrusions 164 of top and bottom profile members 144 and 146 with the hook-like protrusions 162 of the top and bottom rail members 111 and 113 prevent the unitized panel 104 from moving on the axis that is perpendicular to the plane of the unitized panel 104 and from going off the support frame 102. Additionally, the side profile members 148, 150 of the unit frame 132 may incorporate one or more protrusions 156 (see FIG. 4A). The protrusion(s) 156 may have a rectilinear shape for additional static load support or a hook-like shape (see FIG. 4E) for additional static and dynamic load support.

Figure 4E:
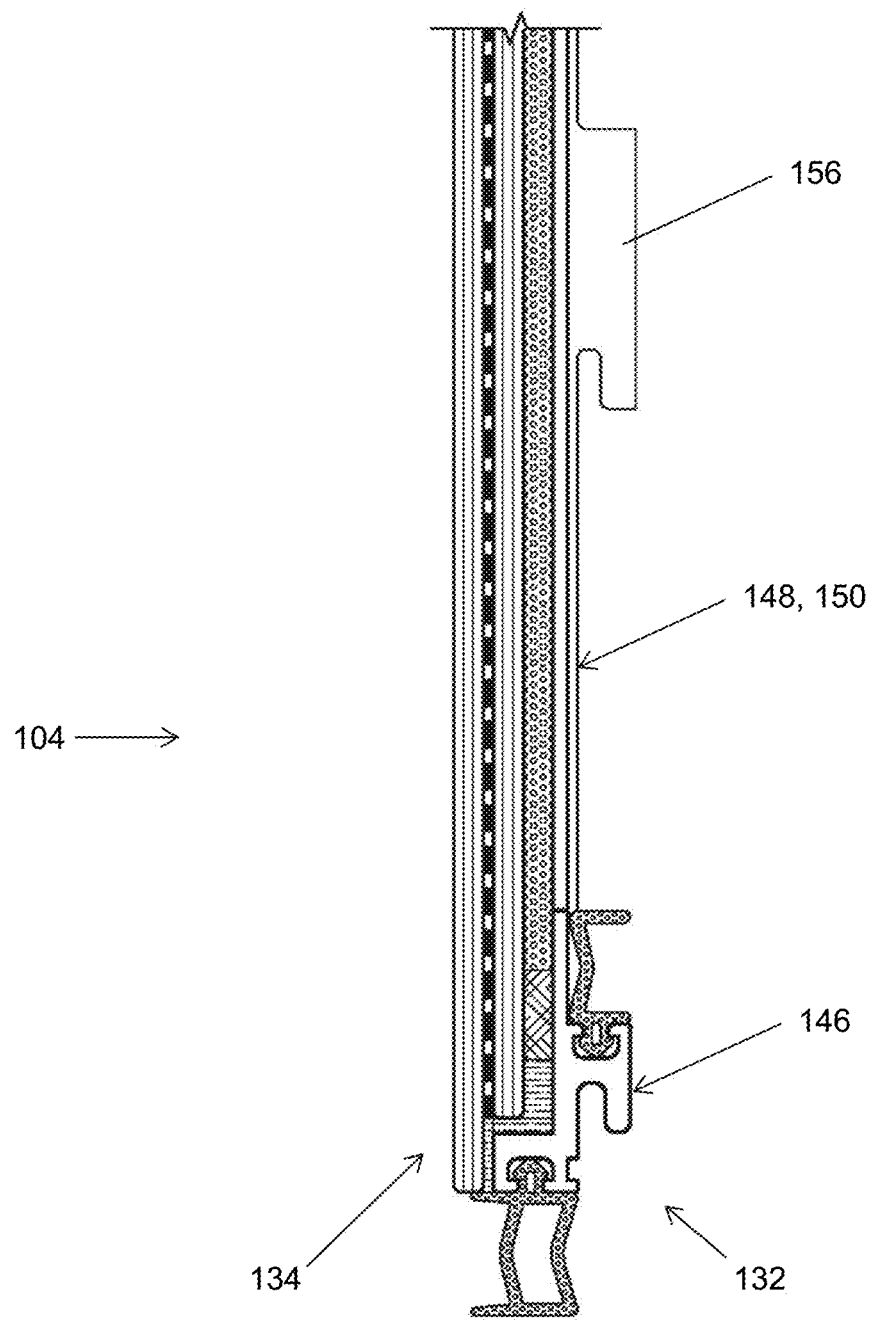
FIG. 4E is a partial section view of one embodiment illustrating a lower portion of a unit frame or profile member.

FIG. 4E is a section view of one embodiment of a lower portion of the unitized panel 104. In FIG. 4E, a hook-like protrusion 156 is visible extending away from and perpendicular to the side profile member 148. When the unitized panel 104 is mounted on the support frame 102, the protrusion(s) 156 will go through a corresponding opening 158 (see FIG. 3A) defined in the side rails 115, 117 of the support frame 102. Once the unitized panel 104 is tucked in place, the hook-like protrusion(s) 156 will engage a portion of the support frame 102. Thus, the hook shape allows the unitized panel to be "locked" horizontally in place with respect to the support frame 102.

In other embodiments, the protrusion(s) 156 may be of any shape and may simply enter the corresponding opening. For instance, if the opening 158 is L-shaped as illustrated in FIG. 3A, the protrusion(s) 156 will initially penetrate the longer, vertical leg, but then be positioned so that it resides in the shorter leg of the opening 158 to prevent the unitized panel 104 from moving vertically and from going off the support frame 102. In certain embodiments, the top and bottom profile members 144, 146 of the unit frame(s) 132 may also incorporate a rubber gasket 154 (see FIG. 4B) with a relatively low compression set or a high durometer to further add additional resistance to the independent vertical movement of the unitized panel 104. In an alternate embodiment, a linear spring-like element may substitute the rubber gasket 154. In alternate embodiments, a fastener, a lock handle, or a latch as commonly known in the art, may be used instead or in addition to lock the unitized panel 104 in place.

Exemplary Installation Method

The glazing shield system 100 can be mounted on either the exterior or the interior side of an existing glazing system. In certain embodiments, one or more support frames 102 may be attached to clean existing infill panels 48 of the existing glazing system 40. See for instance, FIGS. 1, 3B and 3C. In an alternate embodiment, the support frame 102 may be attached to the framework of the existing glazing system. In such an embodiment, structural adhesives would be applied to clean surfaces of a framework surrounding an existing infill panel. In such embodiments, the framework surrounding an existing infill panel can be considered a peripheral area of the infill panel and part of the infill panel itself for purposes of this disclosure and claims.

Figure 5:
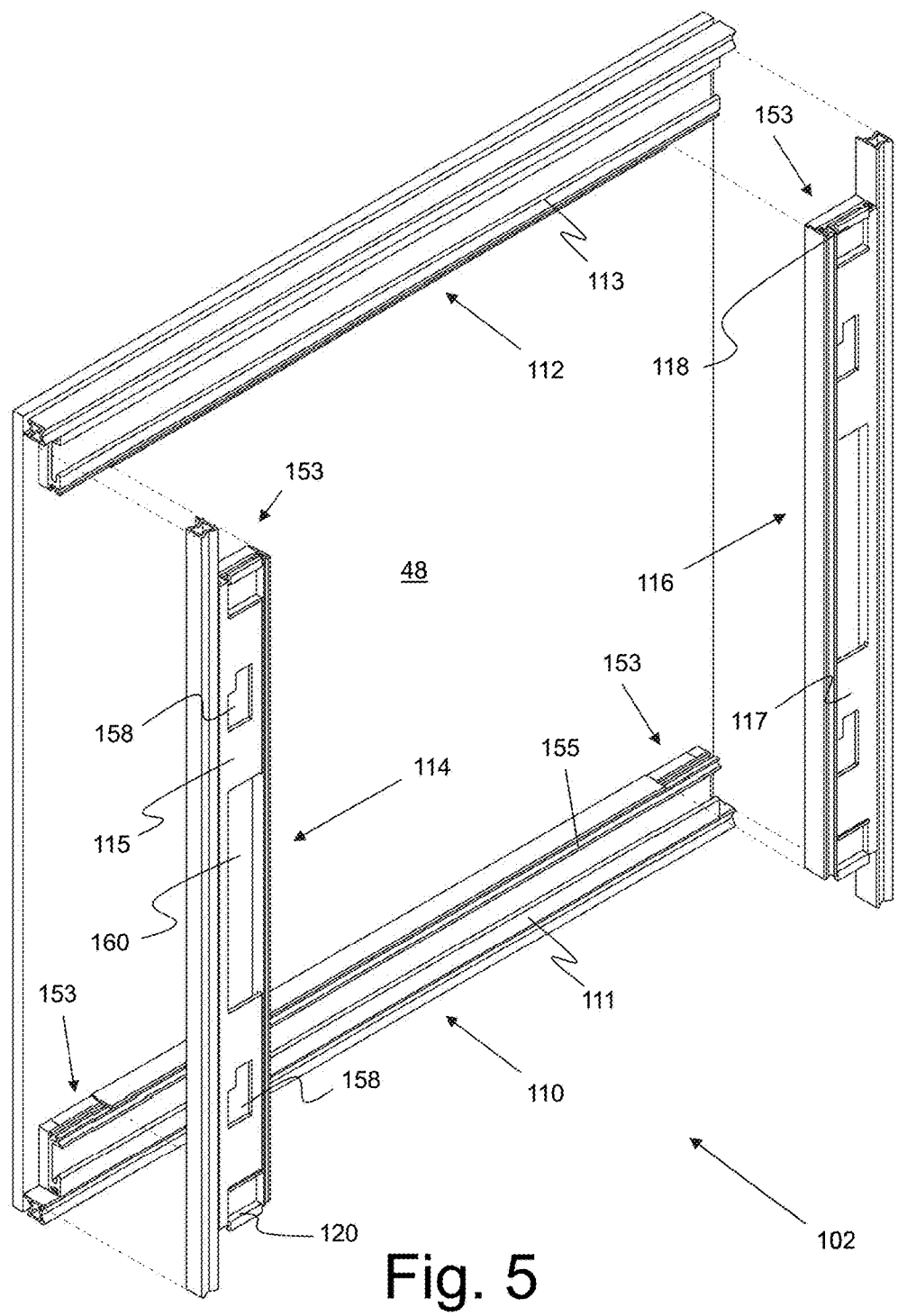
FIG. 5 is an exploded isometric view of the support frame of FIG. 3A illustrating one method of assembly.

In certain embodiments, the support frame 102 may be installed in pieces or in multiple smaller assemblies that are either assembled on site or pre-assembled in a shop or a fabrication facility as shown in FIG. 5. In an alternate embodiment, the support frame 102 may be installed in one piece as a unit that is either assembled on site or pre-assembled in a shop or a fabrication facility.

FIG. 5 is an exploded isometric view of the support frame 102 positioned adjacent to an existing infill panel 48. In the embodiment, illustrated in FIG. 5, the support frame 102 is shown exploded into various components or assemblies and illustrates one method of assembly.

In one embodiment such as illustrated in FIG. 5, the support frame 102 may be installed in separate smaller assemblies, the top and/or bottom rail assemblies 110, 112 may be installed first and the side rail assemblies 114, 116 may then be partially installed while allowing the other top or bottom rail assembly 110, 112 to be correctly positioned relative to the side rail assemblies 114, 116 and be fully installed before completely installing the side rail assemblies 114, 116 (i.e., attached to the infill panel 48). In one embodiment, wherein the structural adhesive seal 126 is utilized (see FIG. 4B), the support frame 102 may be installed by applying the structural adhesive seal 126 to the area that is defined by the double-sided adhesive tapes 124; peeling out the poly-liners off the adhesive tapes 124; and then attaching the support frame 102 to the infill panel 48 after cleaning and preparing the peripheral area of the infill panel 48—following the recommended instructions by the structural adhesive seal manufacturer—and applying suitable temporary pressure, for instance, about 15 PSI or more.

In an alternate embodiment, where the structural adhesive tape 166 is utilized (see FIG. 4D), the support frame 102 may be installed by peeling out the poly-liner off the structural adhesive tape 166 and then attaching the support frame 102 to the infill panel 48 after cleaning and preparing the peripheral area of the infill panel 48—following the recommended instructions by the structural adhesive tape manufacturer—and applying suitable temporary pressure, for instance, of 15 PSI or more.

In one embodiment, top hook-like connector pieces 118 and bottom hook-like connector pieces 120 (see FIGS. 3B and 5) may be added to the side rails 115, 117 using, for example, a double-sided structural adhesive tape 122 to connect the side rail assemblies 114, 116 to the top and bottom rail assemblies 110, 112 and allow the support frame 102 to work as a unit. In one embodiment, a wet seal (not shown), such as a butyl- or polyurethane-based sealant), may be applied in the field to the support frame 102—before the side rail assemblies 114, 116 are installed and connected with the top and bottom rail assemblies 110, 112—at areas 153 (see FIG. 5) where the top and bottom rails 111, 113 meet the side rails 115, 117 for a lower WVTR. In one embodiment, a wet seal 155 (see FIG. 5) may be applied in the shop or in the field to the top and bottom rails 111, 113—except where the connector pieces 118, 120 would fit on the top and bottom rail members 111, 113—to easily guide the installation of the side rail assemblies 114,116 to the right location relative to the top and bottom rail assemblies 110 and 112. In one embodiment, a vapor barrier, such as an aluminum tape, may be applied at both ends of the top and bottom rail members 111, 113 of the support frame 102 to seal the open corner for a lower WVTR.

An additional installation step is mounting the pre-fabricated unitized panel 104 onto the support frame 102, which in certain embodiments, may trap a volume of air and create an insulated air gap 142 (see FIGS. 4B, 4C, and 4D) between the infill panel 48 of the existing glazing system 40 and the unitized panel 104 of the glazing shield system 100. To couple the unitized panel 104 to the support frame 102, one or more workers may tuck the unitized panel 104 towards the top right corner of the support frame 102 and push it towards it until the hook-like protrusions 164 of the top and bottom profile members 144, 146 of the unitized panel 104 stop inside the top and bottom rail members 111, 113 of the support frame 102 and the protrusions 156 stop inside their associated openings 158.

Next, the worker(s) may lower the unitized panel 104 until the hook-like protrusions 164 of the top and bottom profile members 144, 146 of the unitized panel 104 rest on and within the space created by the hook-like protrusions 162 of the top and bottom rail members 111, 113 of the support frame 102 and the protrusions 156 rest on and possibly hook within the bottom edge of their associated openings 158, allowing the support frame 102 to carry the unitized panel 104. The worker(s) may then tuck the unitized panel 104 to the worker's left until the protrusions 156 hit the edge of their associated openings 158 and stop the unitized panel 104 from moving further.

An existing façade access system, such as a window washing platform or a building maintenance unit, may be utilized when attaching the support frame and mounting the unitized panel without the need for additional scaffolds or custom installation platforms. In certain embodiments, the unitized panel 104 may also incorporate a number of polyethylene poly-liners, wax papers, and/or other polymer-based protective layers that may be removed right before mounting the unitized panel, which may be used to protect the other adhesive side of the double-sided adhesive tape 137; protect the desiccant elements 140, 141 from getting saturated with moisture before mounting the unitized panel 104; and keep the face of the infill panel 134 that would be adjacent to the air gap 142 clean until mounting the unitized panel 104.

In certain embodiments, the fabrication of the top, bottom, and side rail members 111, 113, 115, 117 of the support frame 102; the top, bottom and side profile members 144, 146, 148, 150 of the unitized panel 104; and the connector pieces 118, 120 may be typically performed using a common extrusion method as presently known in the art. In one embodiment, after the profile members are extruded, the top, bottom, and side rail members 111, 113, 115, 117 of the support frame 102 may be cut to length with a machine saw, for example, using a 90-degree angle while the top, bottom, and side profile members 144, 146, 148, 150 of the unit frame 132 may be cut to length using a 45-degree angle. The hook portion of the top and bottom profile members 144, 146 of the unit frame may then be trimmed to a 90-degree angle using a band saw, for example, for an easier installation. The protrusions 156 may then be trimmed/cut using a machine saw and/or a computer numerical control (CNC) machine, and notches, openings, such as openings 158, 160, etc. may be formed using a CNC machine.

Active (Smart) Embodiments:

In certain embodiments, the unitized panel 104 may be an active, self-sufficient panel able to convert absorbed light into electrical energy, store it in an incorporated energy storage device, and power one or more built-in devices and/or systems in the unitized panel 104, which in turn, may be controlled by the end user, a building automation system, or an energy management system through a built-in control system with power and communication functions including wireless capabilities.

Figure 6A:
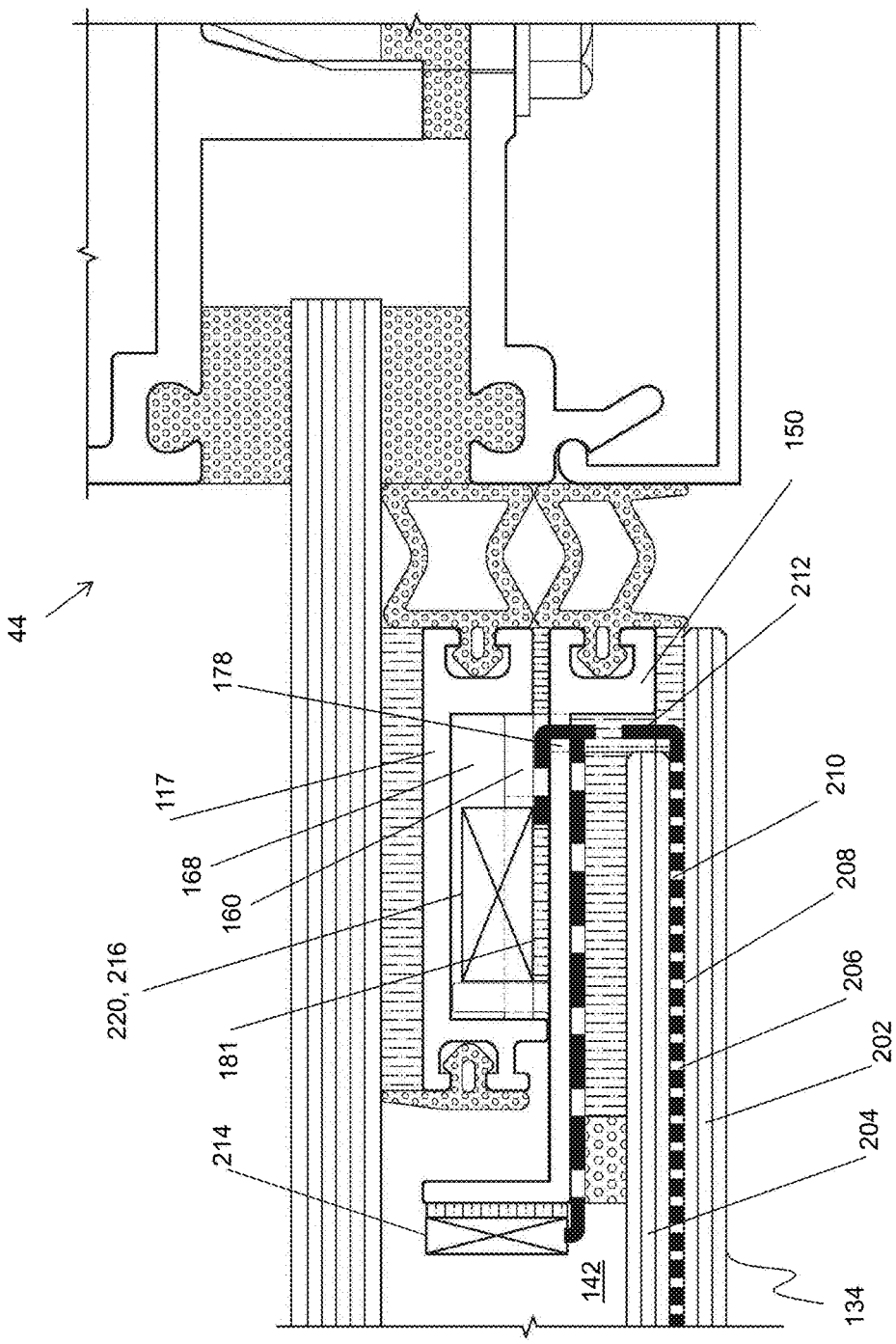
FIG. 6A is a detailed section view illustrating an alternative embodiment employing a smart system.

FIG. 6A is a detailed horizontal section view at an existing vertical rail assembly 44 illustrating one embodiment of the system 100 incorporating various components of a "smart" window or "smart" system. In the embodiment illustrated in FIG. 6A, the infill panel 134 may be a monolithic glazing panel of two or more panes, such as proximal or outer pane 202 and distal or inner pane 204. The panes 202 and 204 may include glass or polymer-based substrates and may be laminated using one or more interlayers 206, such as Polyvinyl Butyral (PVB). In certain embodiments, the infill panel 134 may incorporate one or more photovoltaic (PV) cells or cell systems. As used in this disclosure, the term "cell" may incorporate one or more films and/or coatings known in the industry which essentially operate similar to solar cells. For instance, as used in this disclosure, the term PV cell may include transparent/substantially-clear PV coatings, such as SolarWindow® PV coatings or Ubiquitous Energy® wavelength-selective PV coatings, or it may include a multilayer amalgamation of several layers or coatings to transform light to electrical voltage as is well known in the art. In certain embodiments, the PV cell 208 may be applied to one of the panes of the infill panel 134, such as on a distal surface of the outer pane 202.

Additionally, the infill panel 134 may incorporate one or more electrochromic (EC) layers or layer systems 210. Used in this disclosure, the term "layer" may include one or more films and/or coating layers, which may be conductive layers that have light transmissivity that is variable in response to an electrical current, such as View Glass® or SageGlass® electrochromic coatings. The EC layer 210 may be applied to one of the other panes of the infill panel 134, such as on the proximal surface of the inner pane 204. Additional coatings and/or films may also be incorporated between the layers of the infill panel 134 and/or applied on the proximal surface of the outer pane 202 or the distal surface of the inner pane 204.

The PV cell(s) 208 may incorporate one or more transparent electrodes that connect the photovoltaic coating layer(s) to a control system 220 using wire(s) or leads 212 that go through one or more notches 179 in the side profile members of the unit frame 132, such as profile member 150. Additionally, the EC layer(s) 210 may incorporate one or more electrical connections (not shown), such as busbars, that connect the electrochromic coating layer(s) to the control system 220 using wire(s) 212 that go through one or more notches 179 in the side profile members of the unit frame 132, such as side profile member 150.

In one embodiment, the unit frame 132 may also incorporate a light source, such as linear light-emitting diode (LED) lighting strip 214 that may be connected to the control system 220 using wire(s) 212 that go through the notches 179 in the side profile members of the unit frame 132, such as profile member 150.

In one embodiment, the control system 220 and an energy storage device 216, such as a battery, in communication with the control system 220 may be attached to the side profile members 148, 150 of the unit frame 132 using, for example, a double-sided adhesive tape 181 and located so that they go through the opening 160 and fit inside the cavity 168 defined by the side rail member 117 of the support frame 102 while leaving a tolerance gap for moving/mounting the unitized panel 104 on to the support spacer 102.

Figure 6B:
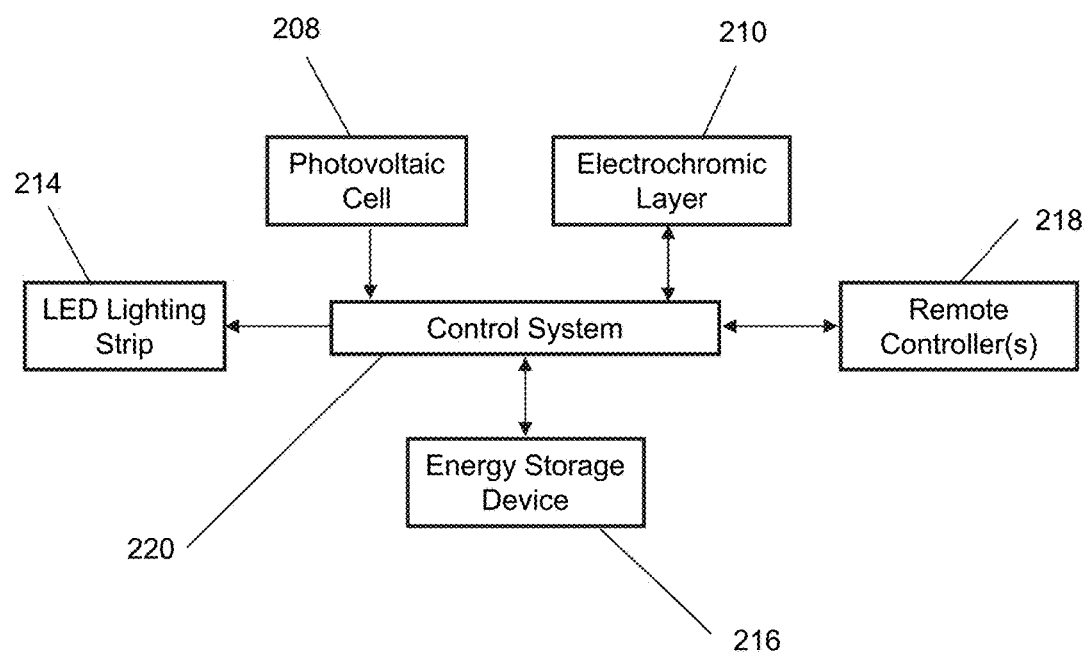
FIG. 6B is a functional diagram of one embodiment of a smart system which may be incorporated into certain embodiments of the present disclosure.

FIG. 6B is a functional diagram of one smart embodiment that may be included in the system 100, which includes the control system 220. As illustrated in FIG. 6B, the control system 220 may be in communication with the PV cell(s) 208, the EC layer(s) 210, the LED lighting strip(s) 214, and the energy storage device 216.

Figure 6C:
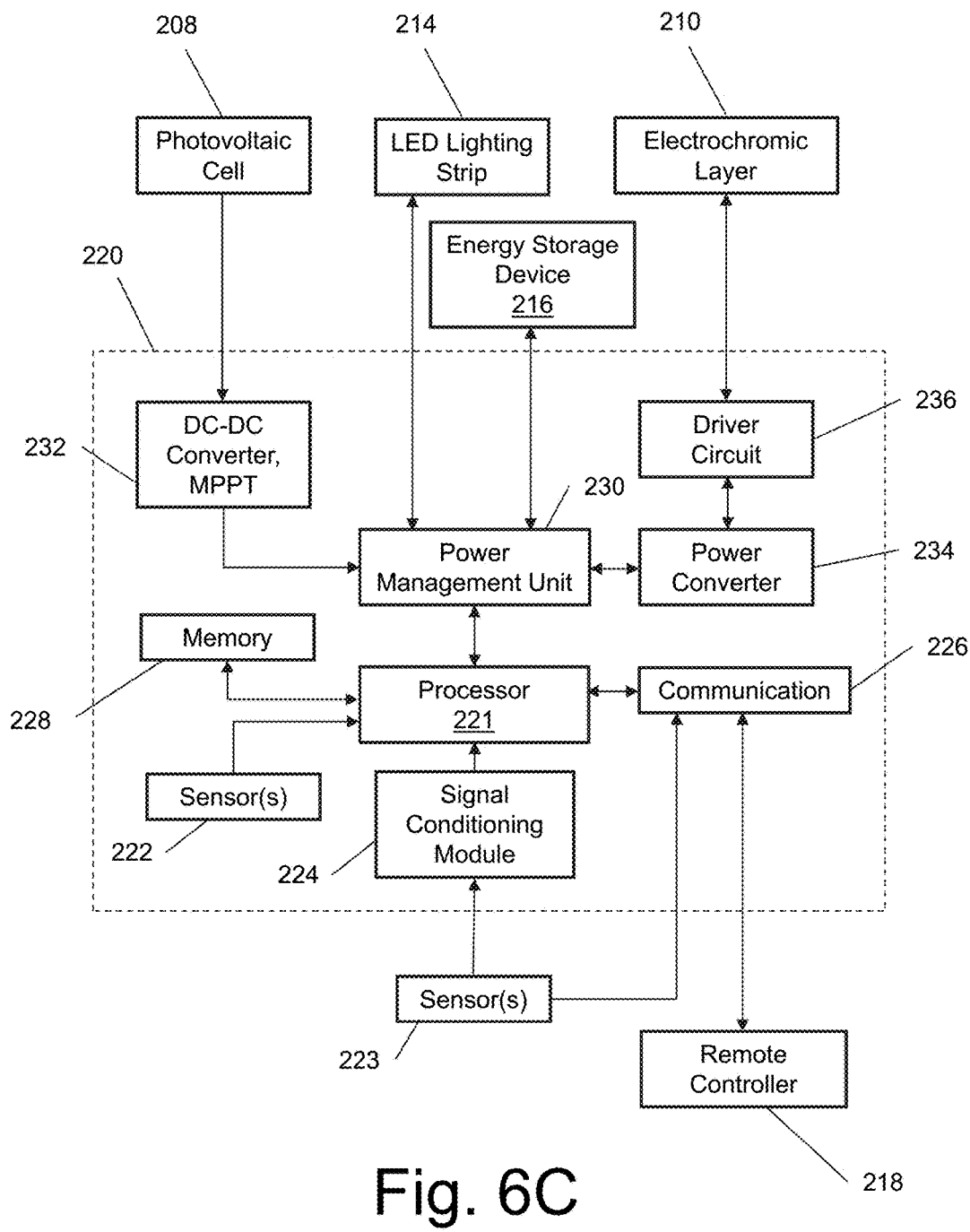
FIG. 6C is a detailed functional diagram of one embodiment of certain components of the smart system of FIG. 6B.

FIG. 6C is a functional diagram of one embodiment of the control system 220. In certain embodiments, the control system 220 may include one or more circuit boards, cards, or chips that may incorporate one or more microcontrollers/processors 221 that include appropriate logic (in a memory 228—See FIG. 6C) for performing one or more power and/or communication control functions, possibly combined in one single circuit board, card, or chip. Additionally, the control system 220 may include a power management unit 230 that direct the electrical energy generated by the PV cell(s) 208 to either charge the energy storage device 214 for later use and/or directly supply current to control/power built-in electronics, devices, and/or systems in the unitized panel 104, including but not limited to, the control system 220, the EC layer(s) 210, and the LED lighting strip 214.

In certain embodiments, the control system 220 may also incorporate boost/DC-DC converters 232 to step up the voltage of the direct current (DC) that is provided by the PV cell(s) 208 to a suitable level for utilization within the system, which may include a maximum power point tracking (MPPT) to maximize power extraction from the PV cell(s) 208 under all conditions. The control system 220 may also incorporate a power converter 234 to convert a low voltage to the power requirements of the EC layer(s) 210 and one or more driver circuits 236 to feed the power to the EC layer(s) 210.

In certain embodiments, the control system 220 may also incorporate one or more communication units 226 that are in communication with the processor(s) 221 and are used for receiving and sending commands wirelessly to and from the control system 220 and one or more remote controllers 218, such as a user interface and/or a building automation system. A computer-readable medium such as the memory 228 in communication with the processor(s) 221 may be used to store such commands and to store other system information about the unitized panel 104 in a configuration file. In certain embodiments, there may also be a radio frequency identification tag (RFID) incorporating system information in a configuration file. The communications unit(s) 226 may incorporate a radio for wireless controls, such as RF and/or IR, as well as wireless communication such as Bluetooth, WiFi, Zigbee, EnOcean and the like to send instructions to the processor(s) 221 and to send data out to a building automation system, for example.

The control system 220 may also incorporate one or more onboard sensors 222, such as thermal sensors, in communication with the processor(s) 221. Additionally, the control system 220 may be in communication with one or more remote and/or frame-incorporated sensors 223, such as optical sensors, through a signal conditioning module 224 and/or through the communication circuit(s) 226.

In certain embodiments, output from the remote controller(s) 218 or the sensor(s) 223 to the control system 220 determines a tint level of the EC layer(s) 210, based on various information from the configuration file in the memory 228. The processor(s) 221 may then instruct the power management unit 230 to apply a voltage and/or current to the EC layer(s) 210 to transition to the desired tint level. In certain embodiments, the control system 220 may also be configured to have a user interface, for example when automation is not required, so that it can function as an I/O controller for an end user where, for example, a keypad or other user-controlled interface is available to the end user to control the EC layer(s) functions and/or other functions related to other built-in devices/systems in the unitized panel 104.

In yet other embodiments, the control system 220 may incorporate one or more wireless power transmitters and/or receivers for wireless power functions, which can be used to power one or more electronic devices and/or systems within the unitized panel 104 or transmit power generated by the PV cell(s) 208 for use with other devices in close proximity to the unitized panel 104. Wireless power transmission includes, for example but not limited to, induction, resonance induction, radio frequency power transfer, microwave power transfer and laser power transfer.

It should be noted that while the embodiments are described as a retrofit system to be used with existing glazing systems, those skilled in the art will appreciate that these embodiments, or the glazing shield parts thereof, may also be provided as integral parts of improved new or replacement glazing systems. For example, the removable unitized panel 104 and its associated mounting mechanism may be readily incorporated in the framework of a new glazing system so that it includes a removable, insulated glazing shield to protect and enhance the non-removable primary glazing system.

The abstract of the disclosure is provided for the sole reason of complying with the rules requiring an abstract, which will allow a searcher to quickly ascertain the subject matter of the technical disclosure of any patent issued from this disclosure. It is submitted with the understanding that it will not be used to interpret or limit the scope or meaning of the claims.

The foregoing description of the embodiments of the invention has been presented for the purposes of illustration and description. It is not intended to be exhaustive or to limit the invention to the precise form disclosed. Many combinations, modifications and variations are possible in light of the above teaching. For instance, in certain embodiments, each of the above-described components and features may be individually or sequentially combined with other components or features and still be within the scope of the present invention. Undescribed embodiments which have interchanged components are still within the scope of the present invention. It is intended that the scope of the invention be limited not by this detailed description, but rather by the claims.

The invention claimed is:

1. A system for retrofitting an existing glazing system comprising:
   a support frame comprising:
      an upper rail member having a first hook shaped profile,
      a lower rail member having a second hook shaped profile,
      a first side rail member positioned between the upper rail member and the lower rail member and defining at least one first side rail opening,
      a second side rail member positioned between the upper rail member and the lower rail member and defining at least one second side rail opening,
      wherein the support frame is coupled to a structural adhesive material which is also coupled to a peripheral area of an existing infill panel of the existing glazing system,
   a unitized panel removably coupled to the support frame, the unitized panel comprising:
      a unit frame comprising:
         a head profile member having a first inverted hook shape adapted to mate with the first hook shaped profile,
         a sill profile member having a second inverted hook shape adapted to mate with the second hook shaped profile,
         a first mullion member positioned between the head profile member and the sill profile member and including at least one first vertical protrusion sized to fit within the at least one first side rail opening and having a hook shape in elevation sized to mate with a portion of the first side rail member positioned around the at least one first side rail opening,
         a second mullion member positioned between the head profile member and the sill profile member and including at least one second vertical protrusion sized to fit within the at least one second side rail opening and having a hook shape in elevation sized to mate with a portion of the second side rail member positioned around the at least one second side rail opening,
      a new infill panel having a perimeter which is coupled to a structural adhesive material which is coupled to the unit frame.

2. The system of claim 1, further comprising an insulating glazing system, the insulating glazing system comprising:
   a first seal with a low water vapor transmission rate, the first seal positioned between the support frame and the existing infill panel,
   a second seal with a low water vapor transmission rate, the second seal positioned between the support frame and the unit frame at the periphery of the unit frame, and
   a third seal with a low water vapor transmission rate, the third seal positioned between the unit frame and the new infill panel at the periphery of the new infill panel.

3. The system of claim 2, wherein the insulating glazing system further comprises a first desiccant element positioned between the infill panel and the unit frame.

4. The system of claim 2, wherein the insulating glazing system further comprises a second desiccant element positioned between the unit frame and the support frame.

5. The system of claim 1, wherein the infill panel is a laminated glazing panel comprising at least two panes forming a peripheral step between panes such that an outer pane extends to the periphery of the unit frame.

6. The system of claim 1, wherein the existing infill panel is a new infill panel.

7. The system of claim 1, further comprising at least one peripheral outer seal coupled to an exterior peripheral surface of the unitized panel.

* * * * *